(12) United States Patent
Jowell et al.

(10) Patent No.: US 7,103,585 B2
(45) Date of Patent: Sep. 5, 2006

(54) SYSTEM AND METHOD FOR LOGICAL AGENT ENGINE

(75) Inventors: Mark Samuel Jowell, Atlanta, GA (US); Hans Christopher Kessock, Isle of Palms, SC (US)

(73) Assignee: Logic Junction, Marietta, GA (US)

( * ) Notice: Subject to any disclaimer, the term of this patent is extended or adjusted under 35 U.S.C. 154(b) by 513 days.

(21) Appl. No.: 10/139,487

(22) Filed: May 6, 2002

(65) Prior Publication Data

US 2003/0023572 A1 Jan. 30, 2003

(51) Int. Cl.
*G06N 5/00* (2006.01)
(52) U.S. Cl. .................................. 706/45; 706/47
(58) Field of Classification Search ............... 706/11, 706/45, 60; 715/707
See application file for complete search history.

(56) References Cited

U.S. PATENT DOCUMENTS

| | | | | |
|---|---|---|---|---|
| 6,169,992 | B1 * | 1/2001 | Beall et al. ............. | 707/103 R |
| 6,233,570 | B1 * | 5/2001 | Horvitz et al. ............ | 706/11 |
| 6,260,035 | B1 * | 7/2001 | Horvitz et al. ............ | 706/60 |
| 6,262,730 | B1 * | 7/2001 | Horvitz et al. ............ | 715/707 |
| 6,400,996 | B1 | 6/2002 | Hoffberg et al. | |
| 2002/0151992 | A1 | 10/2002 | Hoffberg et al. | |

OTHER PUBLICATIONS

Intelligent Software Agents on the Internet: an inventory of currently offered functionality in the information society & a prediction of (near-) future developments, Björn Hermans; Tilburg University, Tilburg, The Netherlands, Jul. 9, 1996, pp. 1-88.
Intelligent Software Agent on the Internet, Björn Hermans, First Monday, vol. 2 No. 3 Mar. 3, 1997.

* cited by examiner

Primary Examiner—Wilbert L. Starks, Jr.
(74) Attorney, Agent, or Firm—Finnegan, Henderson, Farabow, Garrett & Dunner LLP

(57) ABSTRACT

A method of providing information through an intelligent agent with human appearance. The method comprises: executing a script for providing the intelligent agent to a user; receiving queries directed to the intelligent agent by the user; querying a knowledge base associated with the intelligent agent to determine an appropriate response to the query; should the knowledge base associated with the intelligent agent fail to provide an appropriate response to the query, querying a general knowledge base to determine an appropriate response to the query; and providing the appropriate response to the query to the user via the intelligent agent.

11 Claims, 30 Drawing Sheets

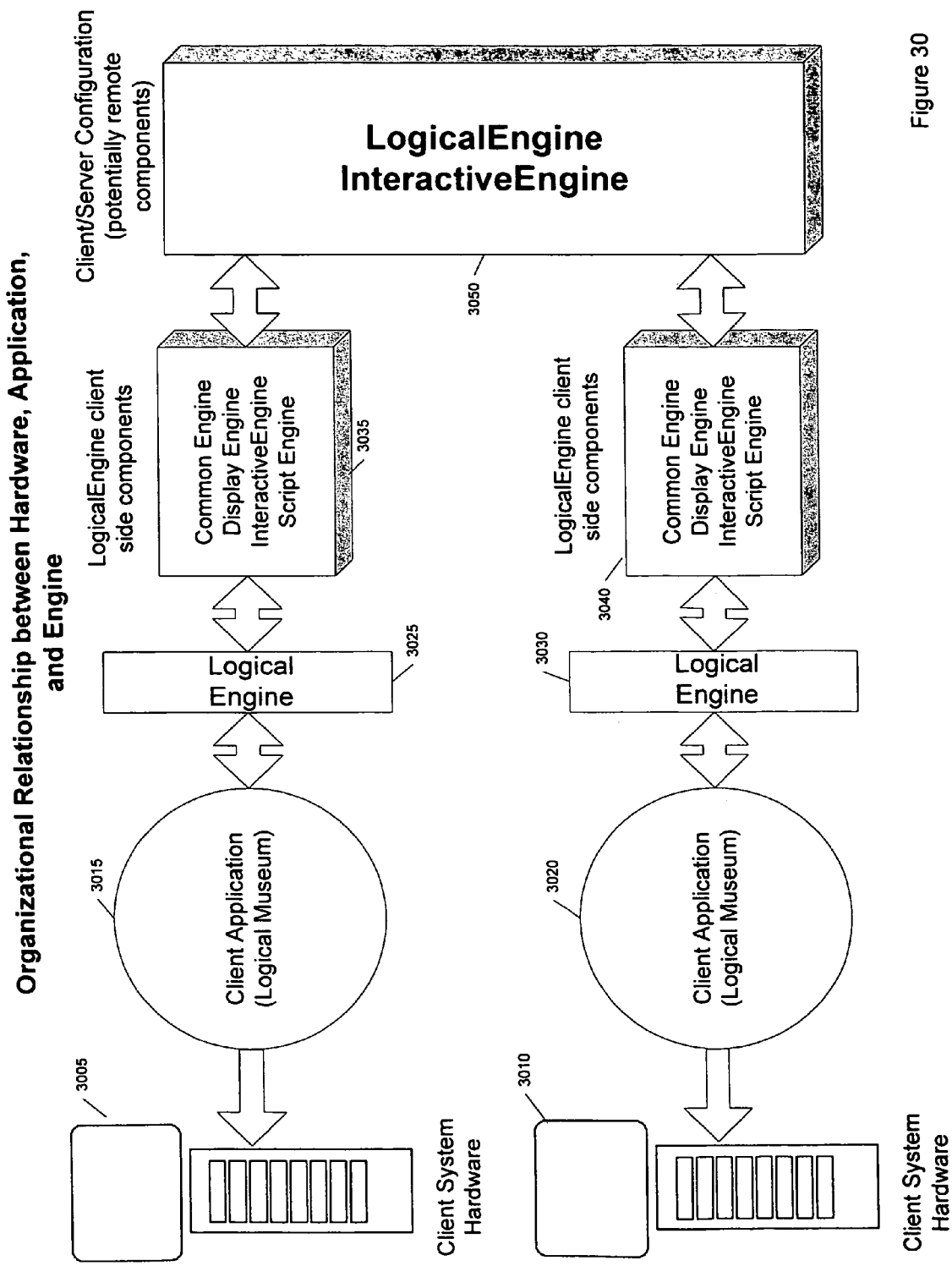

SYSTEM AND METHOD FOR LOGICAL AGENT ENGINE

DESCRIPTION OF THE INVENTION

1. Field of the Invention

The present invention relates to the field of intelligent agents, and more particularly, to a system and method for providing a logical agent engine.

2. Background of the Invention

While computers are capable of being great storehouses of data, there is an ever increasing need to turn that data into useful information and to provide a means of easily accessing that information. Databases have existed for some time to store vast quantities of raw data, and some have even discovered ways of organizing that data into useful information. However, accessing the information in a user friendly manner continues to be elusive.

Few individuals, be they computer savvy or computer ignorant, find any degree of pleasure in wading through vast quantities of data using traditional techniques. Certainly text based interfaces to data storehouses, such as Google or Ask Jeeves, provide some degree of ease of use, but they lack any degree of human look or feel to guide novice users. In addition, these text based interfaces provide no degree of excitement to the quest for knowledge.

Some have tried to put a more user friendly face on data access through the use of intelligent agents with some form of animated interface. For instance, Microsoft supplies the "Clippy" character to assist user's of Microsoft Word in utilizing features of the program and answering questions relating to operation of Word. However, such animations tied to intelligent agents, while providing a less intimidating front end to an intelligent system, fail to provide the more human interaction to which people respond. In fact, many people turn to avoid the use of "Clippy" and other such agents precisely because of their inability to provide truly useful answers and interfaces.

What is needed is a system for linking an intelligent agent engine in software with a human like interface. In addition, a system is needed to provide easy access to a storehouse of information whereby a natural language query will return a useful result.

The present invention is directed at overcoming one or more of the above described shortcomings of the prior art.

SUMMARY OF THE INVENTION

In accordance with the invention, a method of providing information through an intelligent agent with human appearance is provided. The method comprises: executing a script for providing the intelligent agent to a user; receiving queries directed to the intelligent agent by the user; querying a knowledge base associated with the intelligent agent to determine an appropriate response to the query; should the knowledge base associated with the intelligent agent fail to provide an appropriate response to the query, querying a general knowledge base to determine an appropriate response to the query; and providing the appropriate response to the query to the user via the intelligent agent.

In accordance with additional embodiments of the invention, a machine readable medium for storing instruction for operating a computer is disclosed. The instructions comprise: executing a script for providing the intelligent agent to a user; receiving queries directed to the intelligent agent by the user; querying a knowledge base associated with the intelligent agent to determine an appropriate response to the query; should the knowledge base associated with the intelligent agent fail to provide an appropriate response to the query, querying a general knowledge base to determine an appropriate response to the query; and providing the appropriate response to the query to the user via the intelligent agent.

Further embodiments of the present invention provide a system for providing an intelligent agent to interact with a user. The system comprises a database, memory, a display, an input device, and a processor. The database stores a general knowledge base and a knowledge base associated with the intelligent agent. The display displays the intelligent agent. The input device receives input from the user. The processor is coupled to the database, the memory, the display and the input device. The processor is operable to: execute a script for providing the intelligent agent to the user on the display; receive queries directed to the intelligent agent by the user from the input device; query the knowledge base associated with the intelligent agent to determine an appropriate response to the query; should the knowledge base associated with the intelligent agent fail to provide an appropriate response to the query, query the general knowledge base to determine an appropriate response to the query; and provide the appropriate response to the query to the user via the intelligent agent on the display.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 30 illustrates an exemplary embodiment of a client/server hardware setup on which the present invention may operate.

DESCRIPTION OF THE EMBODIMENTS

Reference will now be made in detail to an exemplary embodiment consistent with the principles of the present invention, an example of which is illustrated in the accompanying drawings. Wherever possible, the same reference numbers will be used throughout the drawings to refer to the same or like parts.

The present invention provides a logical agent engine operating on a computer system coupled to a display system, whereby the logical agent engine serves as an intelligent database querying system for extracting knowledge to be relayed to a user via a lifelike human image, an intelligent agent, on the display system. Furthermore, embodiments of the present invention may provide for interaction between the user of the system and the intelligent agent, such that the user of the system may query the system for information which will be presented by the intelligent agent via the display system. In addition, the display system may display various multimedia components to the use via a scripting engine, where the variety of multimedia components include, music, pictures, movies, and other items well known to those skilled in the art.

Figure 1:
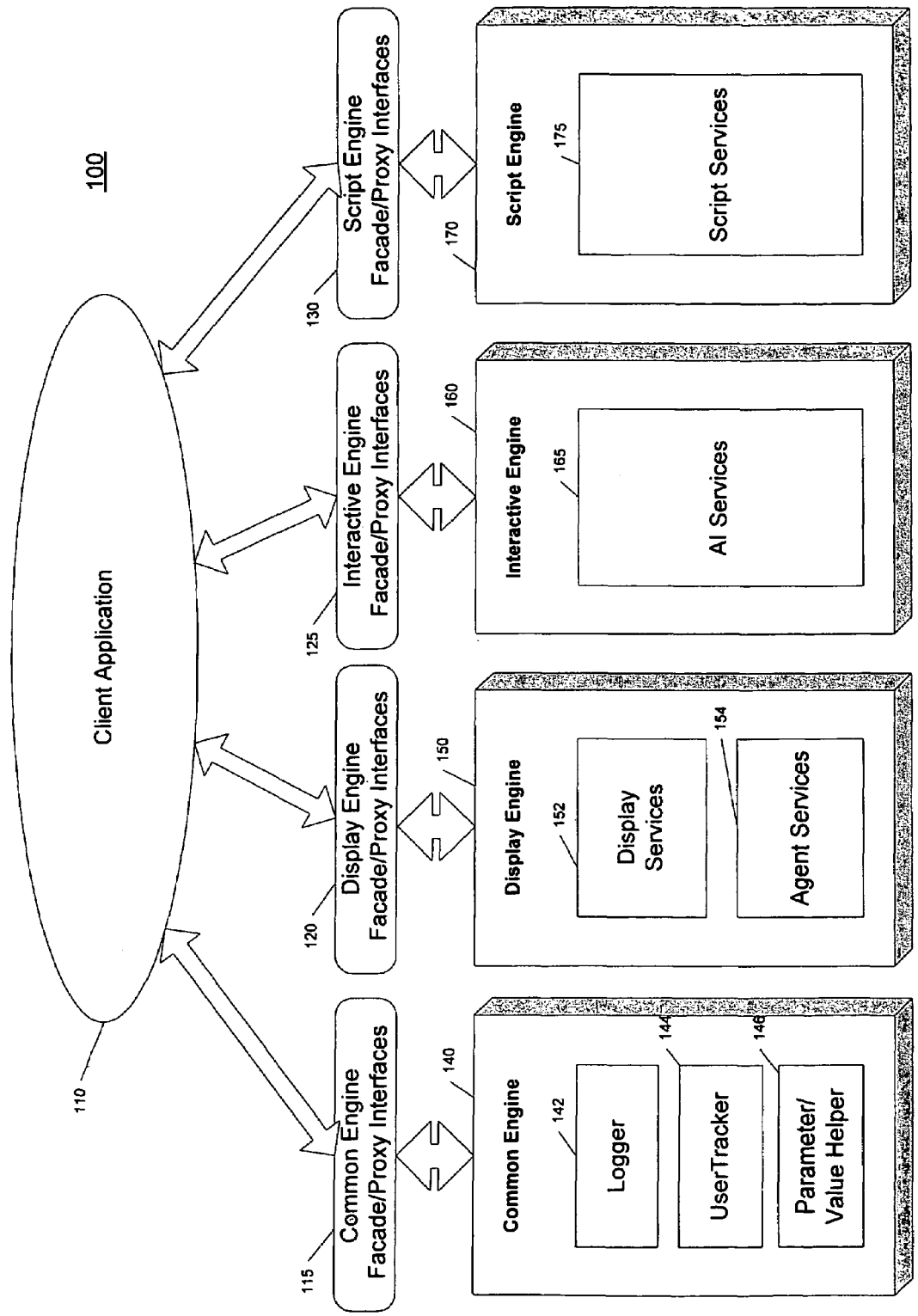
FIG. 1 illustrates an overview of the logical agent engine 100 which provides for the operation of a plurality of engines for powering a logical agent in accordance with the principles of the present invention.

FIG. 1 illustrates an overview of the logical agent engine 100 which provides for the operation of a plurality of engines for powering a logical agent in accordance with the principles of the present invention. A client application 110 interfaces to a plurality of engines for providing the features of the present invention. The client application can be any type of front end, such as a web browser or visual basic client. Client applications are well known to those skilled in the art, and this description is not intended to limit the client applications that may serve as the front end of the logical agent engine 100.

Overview

The client application 110 interfaces to a plurality of engines through a respective plurality of proxy interfaces. While the use of proxy interfaces is described in this exemplary embodiment, they are not required for operation of the present invention. The client application 110 interfaces to a common engine 140 via a common engine proxy 115. The common engine 140 may provide: a logger 142 for storing information gathered during the course of operation of the system 100; a user tracker 144 for maintaining a database of user's of the system; and a parameter/value helper 146 for storing parameter information to be shared among the various engine.

Client application 110 interfaces to the display engine 150 through a display engine proxy 120. The display engine provides display services 152 for displaying information and multimedia on the display of the system 100. For example, the display services 152 provides the capabilities to display movies on the display. Like the rest of the system, the display services 152 is extensible and scalable to support new technologies as they are developed. In addition, the display engine 150 comprises an agent services engine 154 for providing the capabilities of displaying and manipulating an intelligent agent on the display of the system 100.

The intelligent agents serve as animated characters, or digital human, with which a user can interface. The intelligent agent may educate, chat, or otherwise interact with the user. The system 100 may provide one or more intelligent agents that have a number of appearances with varying personalities. In an exemplary embodiment of the present invention, Microsoft Agent is used to power the intelligent agent display technology. The intelligent agents may have a number of voices and speak in languages other than English. The agent services engine 154 can change the speed and pitch of the voices of the agent. Agents may be resized and positioned around the monitor during the course of a session with the user, and agent can be fully animated. For example, agents can smile, gesture, wink, wave, or even blow kisses. Full body agents can run, walk, jump, or dance. The animations utilized with the agents is truly unlimited, as those skilled in the art will appreciate.

The client application may interface with an interactive engine 160, comprising an AI Services engine 165, via the interactive engine interface 125. The AI Services 165 implement the artificial intelligence behind the intelligent agents. A fuller description of the AI Services engine 165 follows later, but suffice it to say for now that the AI Services engine 165 provides for accurate and flexible response to natural language queries by searching a knowledge base stored on the system.

The client application 110 interfaces with the script engine 170 via a script engine interface 130. The script engine 170 loads, verifies, and executes the scripts that are written to tie together scripted routines used to interface with the user. Operating within the script engine 170 are a plurality of script services 175 to be discussed in more detail at a later point.

The scripts may be drafted in a simplified format to allow non-technical savvy users the ability to easily draft scripts. A script editor permits a user to use one or more templates in developing the script. The scripts may have advanced navigation features, such as bookmarks, chapters and looping and conditional constructs. The script engine 170 can interpret each of the various constructs. Those skilled in the art will appreciate the variety of scripting features contemplated by the present invention.

The script engine 170, interactive engine 160, display engine 150, and common engine 140 each may interface directly with each other in order to access routines, or objects or services, provided by the engines. For instance, as a script is being executed by the script engine 170, it may access AI Services 165 of the interactive engine 160, services of the display engine 150, and features of the common engine 140.

Objects and Features of the Engines

Figure 2:
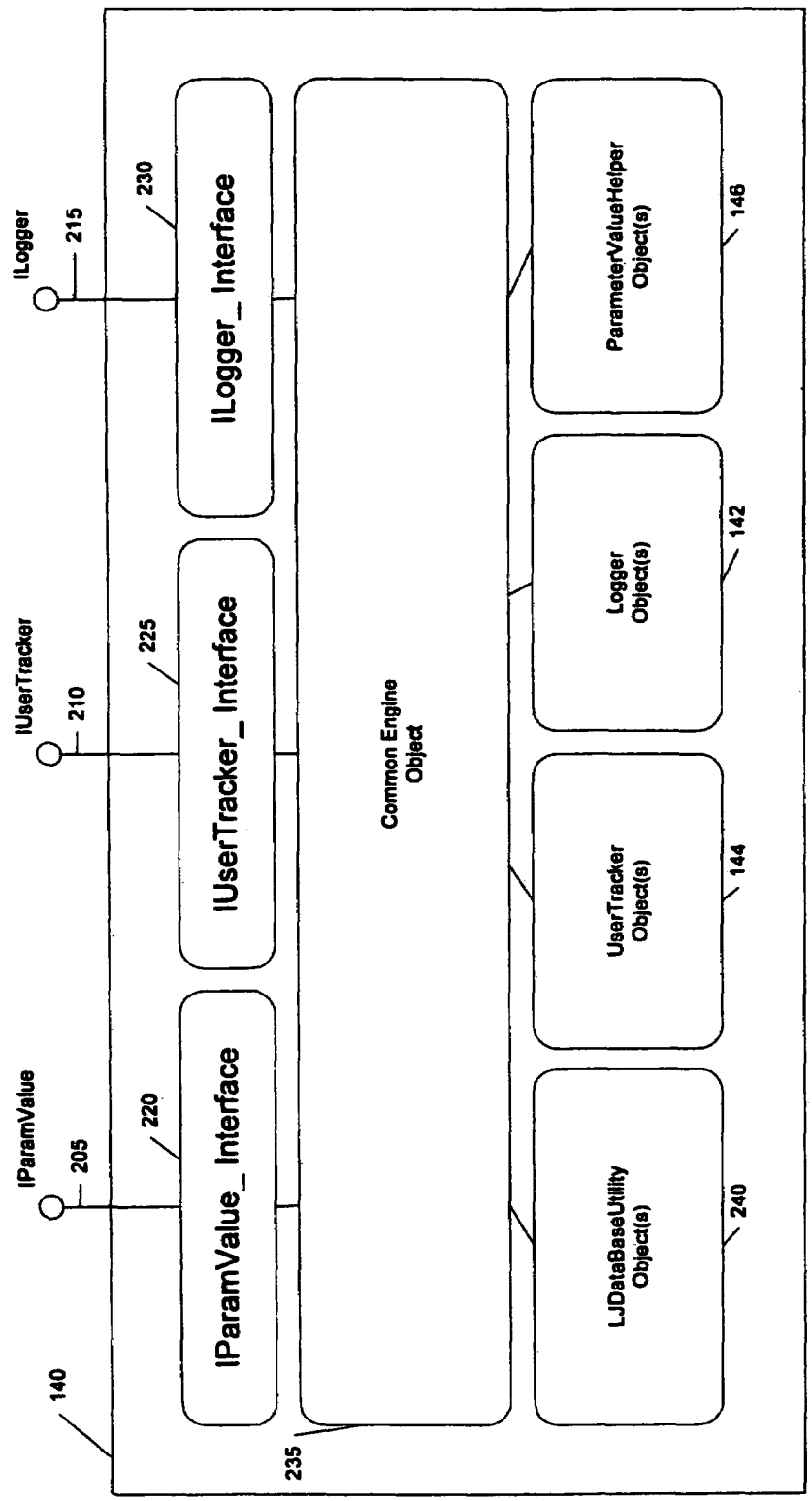
FIG. 2 illustrates a functional overview of the common engine 140 in an exemplary embodiment consistent with the principles of the present invention.

FIG. 2 illustrates a functional overview of the common engine 140 in an exemplary embodiment consistent with the principles of the present invention. The common engine 140 comprises a number of interfaces for accessing the features within the common engine 140. As previously mentioned, the common engine 140 may be accessed, and likely will be accessed by several of the other engines. A parameter value interface 220, user tracker interface 225 and logger interface 230 may be used to access the functions of the common engine 140. Each of these interfaces may go through the common engine object 235 for accessing its respective feature object. A user tracker object 144 is used to store and retrieve information about users of the system. In addition, information about some or all of a user's interactive session may be stored. Names, ages, and other information of the sort, may be stored and retrieved utilizing the user tracker object 144. Those skilled in the art will appreciate the quantity and type of user information that could be gathered. By storing the data, users who have previously used the system will not have to reenter data, which may be password stored for quick and safe retrieval.

Logger object 142 may maintain a database, or log database, of activity within the system. By maintaining a log, activity on the system can be monitored, stored, retrieved, and later analyzed to determine the system use and health. Error data may also be stored by logger object 142. Parameter helper 146 may be used as a temporary or permanent storehouse of parameters in use globally, or during an individual session. For instance, a default first name could be stored for a user whose first name is unknown.

Database utility object 240 is used as a pluggable database architecture on which the rest of the system rests. By utilizing a replaceable database architecture, the system can rapidly be changed from a first architecture to a second architecture. For example, an SQL architecture may later be replaced as technology advances.

Figure 3:
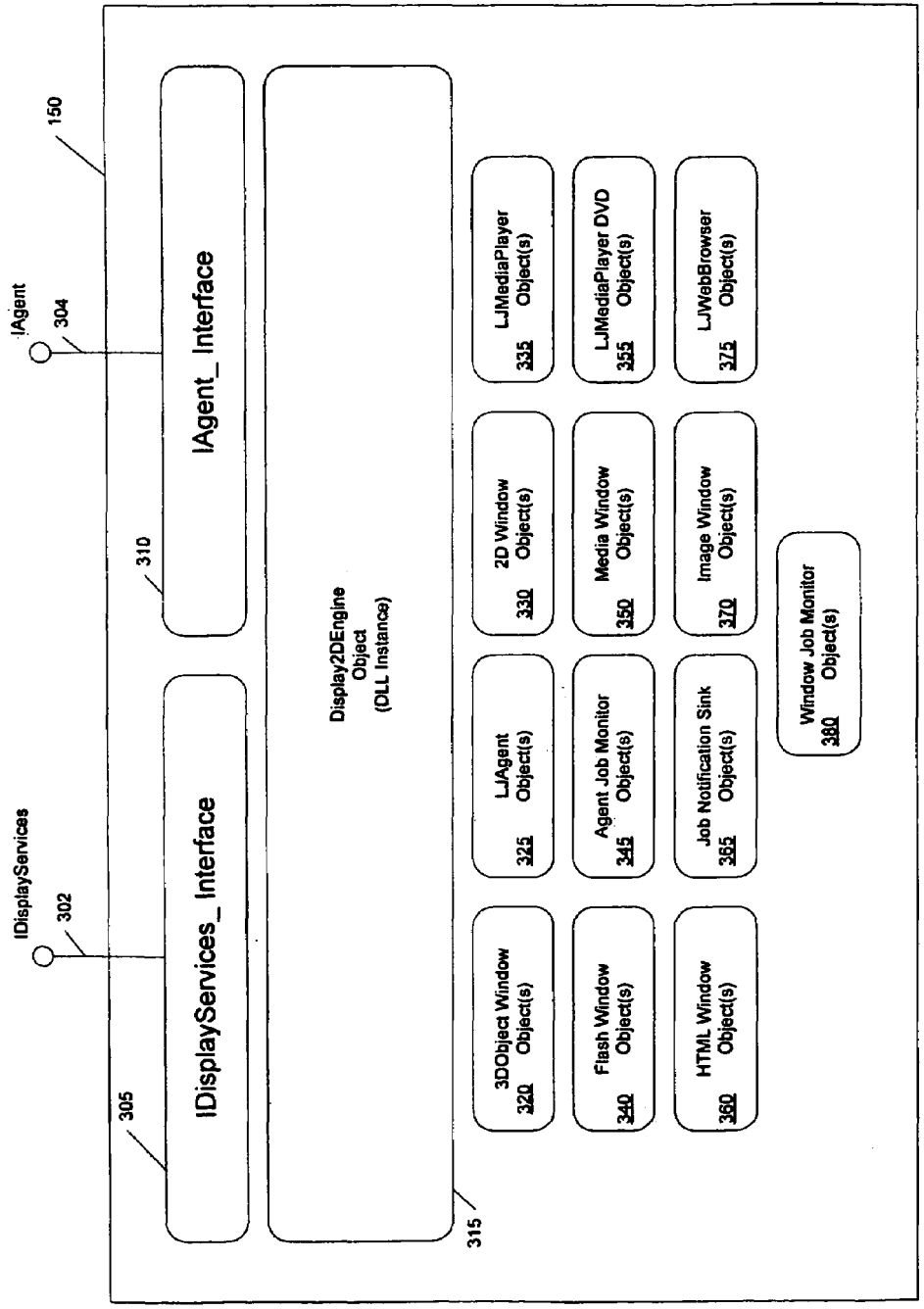
FIG. 3 illustrates a functional overview of the display engine 150 in an exemplary embodiment consistent with the principles of the present invention.

FIG. 3 illustrates a functional overview of the display engine 150 in an exemplary embodiment consistent with the principles of the present invention. The display engine comprises two interfaces: display services interface 305 and agent interface 310 for accessing the objects within display engine 150. The display services engine 152 may comprise 3D object window object 320, flash window object 340, html window object 360, job notification window object 365, 2D window object 330, media window object 350, image window object 370, window job monitor object 380, media player object 335, media player dvd object 355, and web browser object 375. Agent services 154 may comprise LJAgent Object 325 and Agent Job Monitor Object 345. All of these can be expanded as technology changes and improves. These object may be accessed via display 2D engine object 315. Those skilled in the art will appreciate the operation of these objects, and how they provide interfaces to multimedia capabilities that are plugged into the architecture of system 100.

Figure 4:
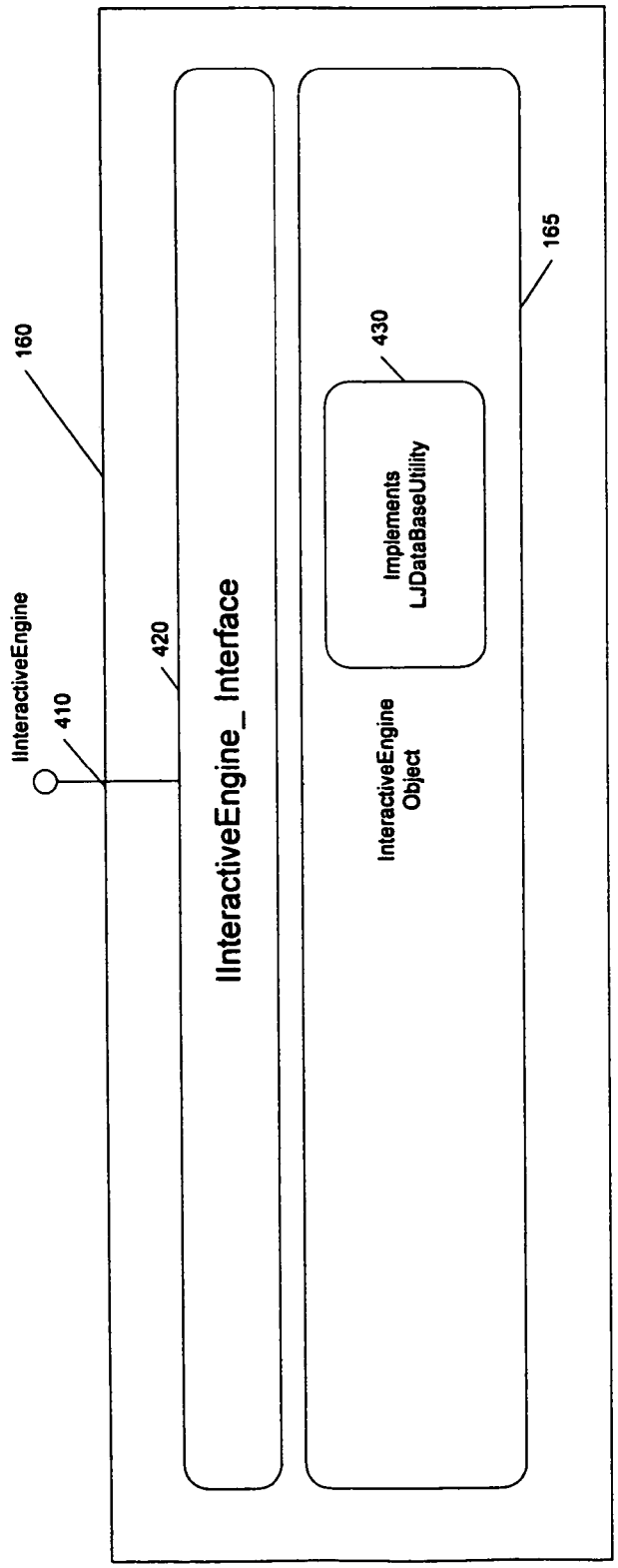
FIG. 4 illustrates a functional overview of the interactive engine 160 in an exemplary embodiment consistent with the principles of the present invention.

FIG. 4 illustrates a functional overview of the interactive engine 160 in an exemplary embodiment consistent with the principles of the present invention. The interactive engine may have interactive engine interface 160 for accessing the interactive engine object 165, containing database utility 430. The complex operation of the interaction engine 165 will be explained in more detail later. The engine provides the logic for querying the knowledge base stored within system 100.

Figure 5:
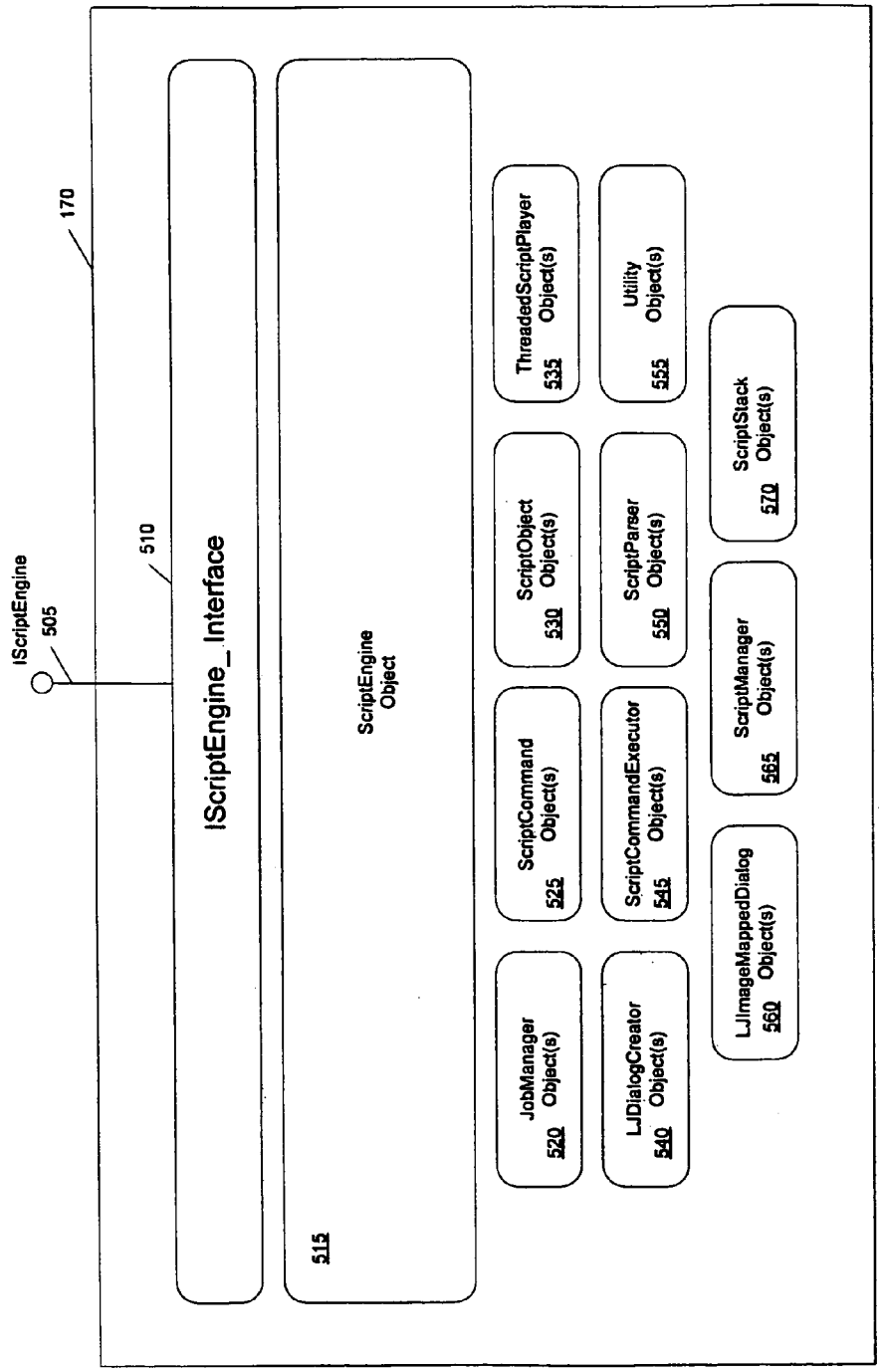
FIG. 5 illustrates a functional overview of the scripting engine 170 in an exemplary embodiment consistent with the principles of the present invention.

FIG. 5 illustrates a functional overview of the scripting engine 170 in an exemplary embodiment consistent with the principles of the present invention. A script engine interface 510 may be used to access the various scripting objects through script engine object 515. A plurality of objects 520 through 570 are used to load and execute scripts for enabling the operation of the system 100. Explanation of the function of these objects will be detailed through flowcharts which are to follow. The script engine 170 provides for execution of scripts and interaction with the other engines, including the nesting of scripts.

Figure 6:
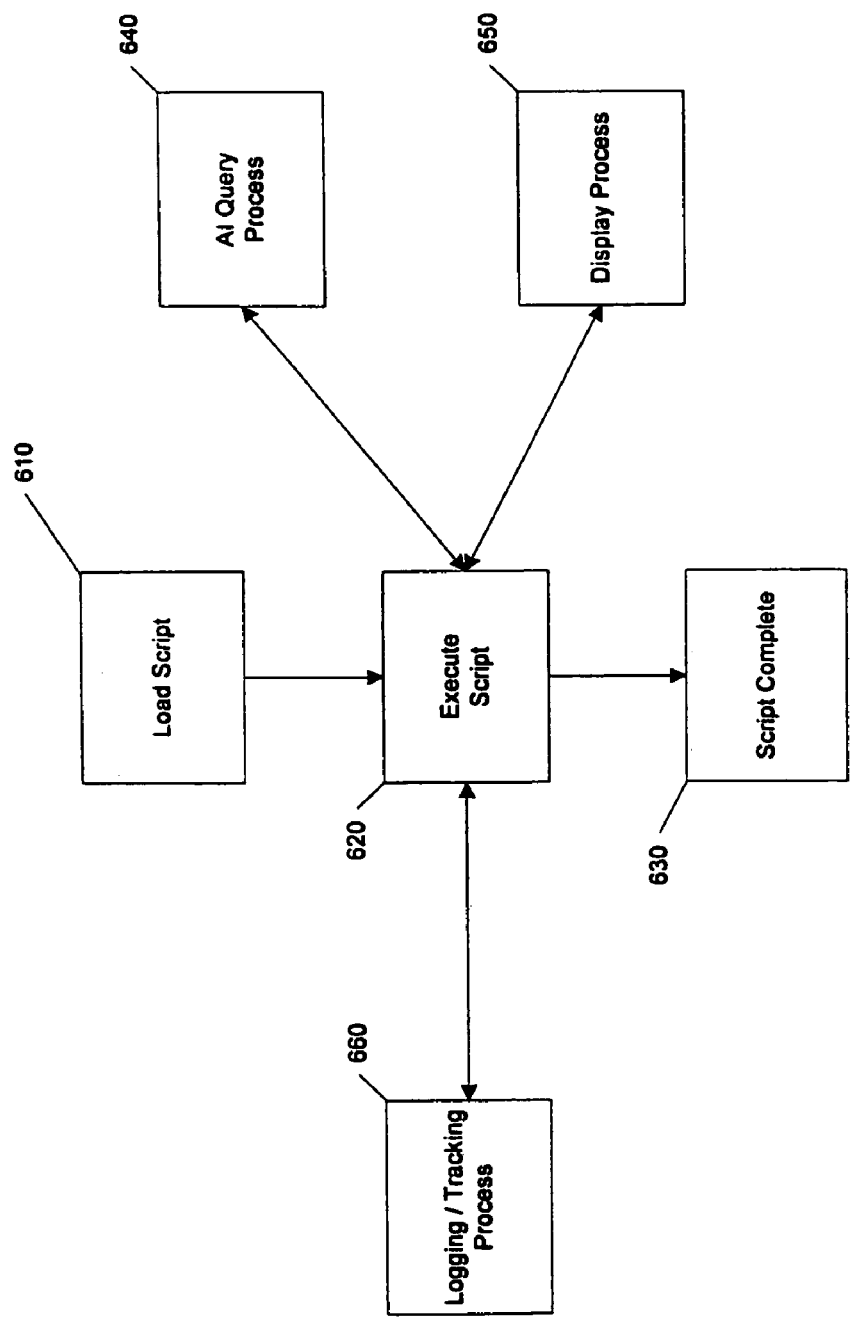
FIG. 6 is a flowchart illustrating the operation of the system 100 consistent with the principles of the present invention.

Process Flow Diagrams of Exemplary Embodiments Consistent with the Present Invention FIG. 6 is a flowchart illustrating the operation of the system 100 consistent with the principles of the present invention. At stage 610, a script is loaded into the scripting engine 170. At stage 620, the script begins execution, and the script engine 170 may call one or more of an AI Query process 640, a Display Process 650, and/or a Logging/Tracking Process 660. These may be called during execution of the script. At stage 630, the operation of the script completes, although some embodiments of the invention may feature scripts that run continuously. The script engine 170 serves as mechanism which drives all other features in an exemplary embodiment of the present invention.

The Script Process

Figure 7:
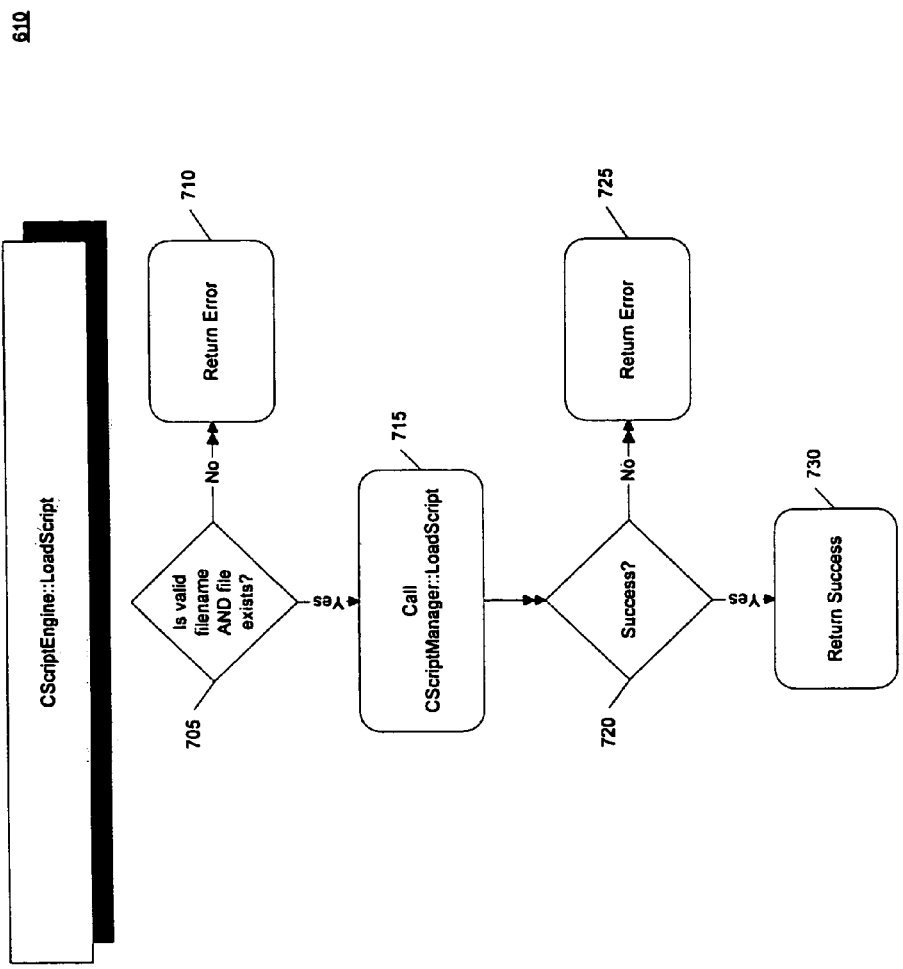
FIG. 7 illustrates the load script process 610 in an exemplary embodiment consistent with the present invention.

FIG. 7 illustrates the load script process 610 in an exemplary embodiment consistent with the present invention. At stage 705, the process checks to see if the filename is valid and if the file exists. If either of these fails, at stage 710 and error is returned and execution halts. If the file is valid, at stage 715, the loadscript process is executed for loading the script into the system. At stage 720, an evaluation is made as to whether the script was successfully loaded. If not, at stage 725 an error is returned; if so, at stage 730, a successful load is returned.

Figure 8:
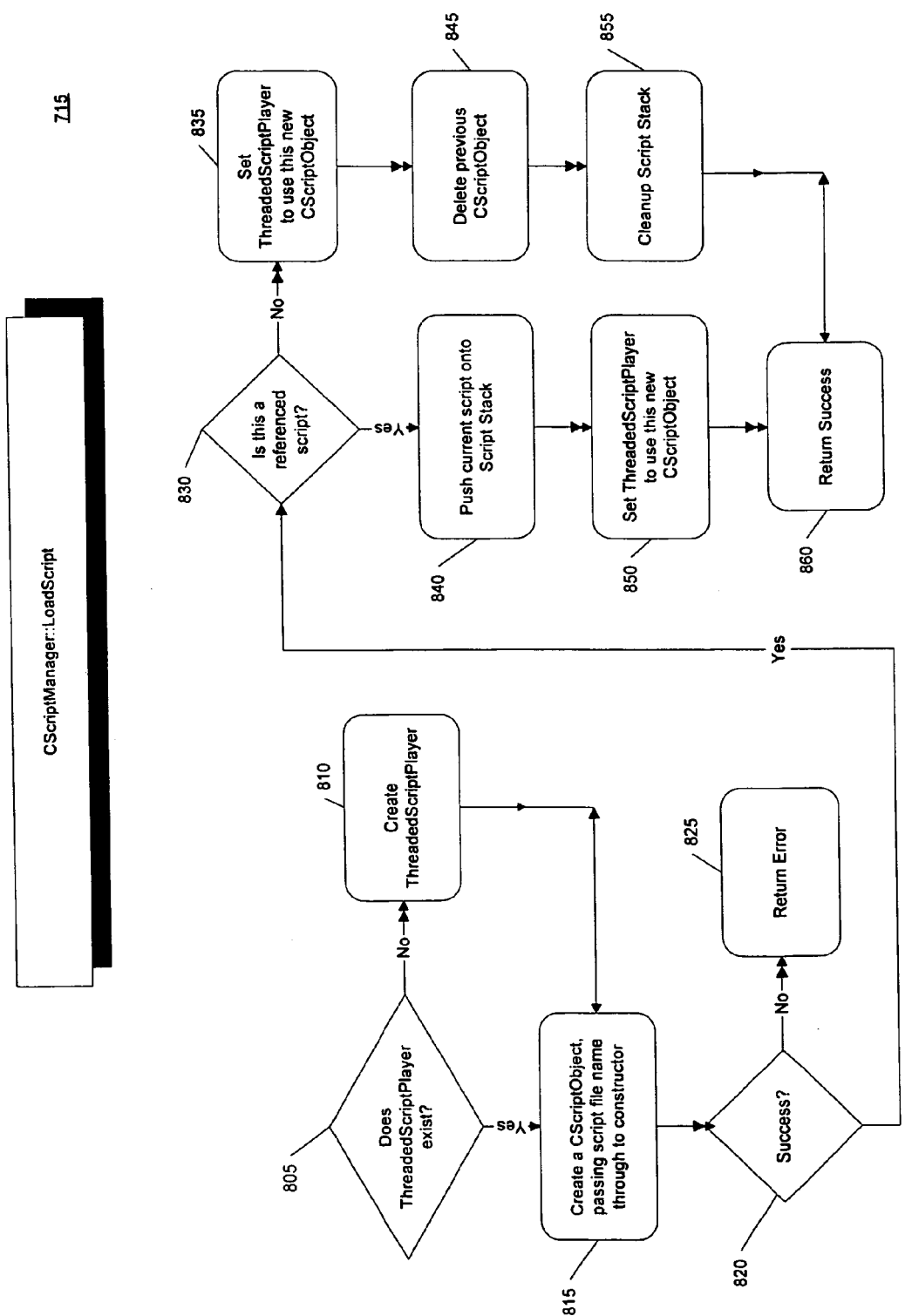
FIG. 8 illustrates the scriptmanage:loadscript process 715 in an exemplary embodiment consistent with the present invention.

FIG. 8 illustrates the scriptmanage:loadscript process 715 in an exemplary embodiment consistent with the present invention. At stage 805, the system evaluates whether the threaded script player object exists. If not, the threaded script player is created in stage 810, and processing continues to stage 815. At stage 815, with a threaded script player created, a CScriptObject is created that passes the name of the script file to the constructor. If this is not successfully accomplished, at stage 825 an error is returned.

If this is accomplished successfully, at stage 820 flow passes to stage 830 where a determination is made as to whether this new CScriptObject is a referenced script. A referenced script is a script invoked or called from another script. The script system of the present invention allows for the execution of a number of nested scripts and utilizes a stack system to track the stack execution. The use of nested scripting permits great flexibility and reusability of scripts.

If this is not a referenced script, execution proceeds to stage 835 where the threaded script player is set to use this newly created CScriptObject. From there, at stage 845 the previous CScriptObject is deleted and at stage 855, the script stack is cleaned up. Thereafter, at stage 860 a success is returned.

If this is a referenced script, at stage 840, the current script is pushed onto a script stack, and at stage 850, the threaded script player is set to use this new CScriptObject. At stage 860, a success is returned.

Figure 9:
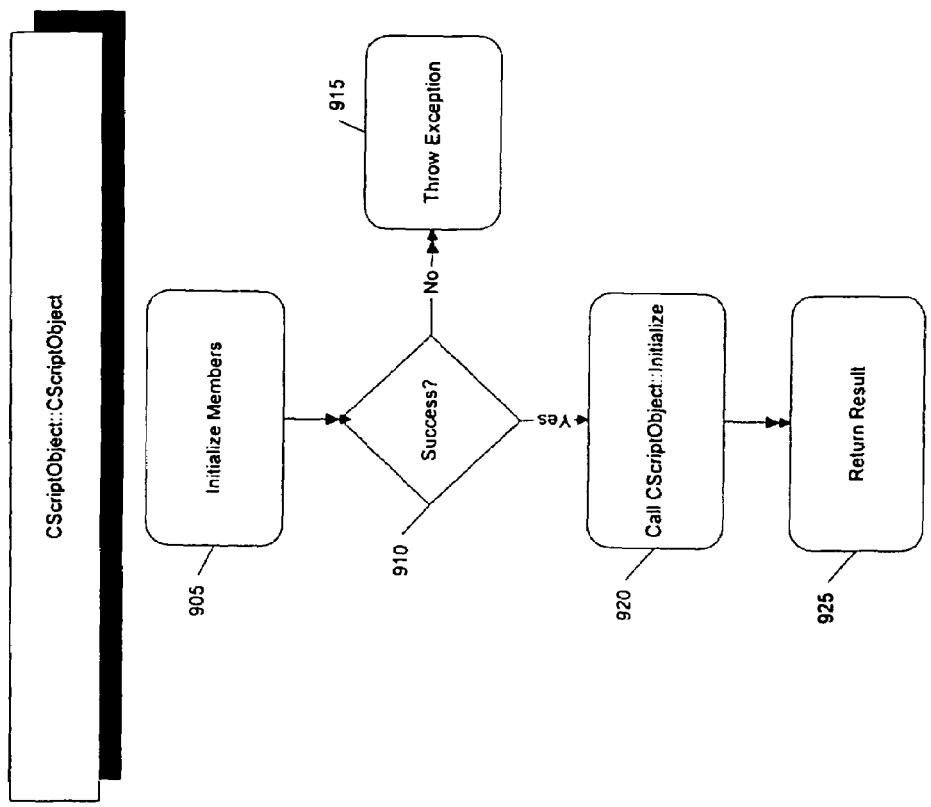
FIG. 9 illustrates a flowchart of the CScriptObject 815 in an exemplary embodiment consistent with the present invention.

FIG. 9 illustrates a flowchart of the CScriptObject 815 in an exemplary embodiment consistent with the present invention. At stage 905, members of the object are initialized. At stage 910, a decision is reached as to whether this has been performed successfully. If not, at stage 915 an exception is thrown. If so, the CScriptObject:Initialize process 920 is called, and at stage 925 the result returned.

Figure 10:
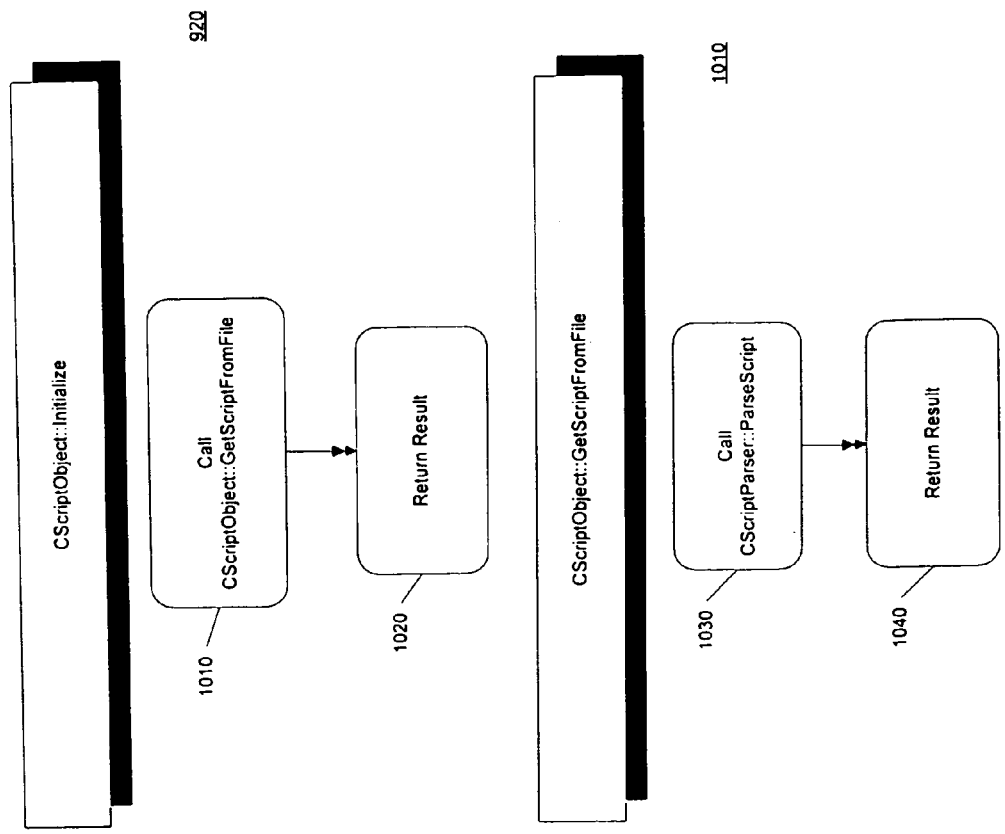
FIG. 10 illustrates a flowchart of the CScriptObject Initialize process 920 and a GetScriptFromFile process 1010 in an exemplary embodiment consistent with the present invention.

FIG. 10 illustrates a flowchart of the CScriptObject Initialize process 920 and a GetScriptFromFile process 1010 in an exemplary embodiment consistent with the present invention. As to the CScriptObject Initialize process 920, at stage 1010, the GetScriptFromFile is called, and at stage 1020 the result returned. As to the GetScriptFromFile 1010 process, the process call the ParseScript process 1030 and returns the result in 1040.

Figure 11:
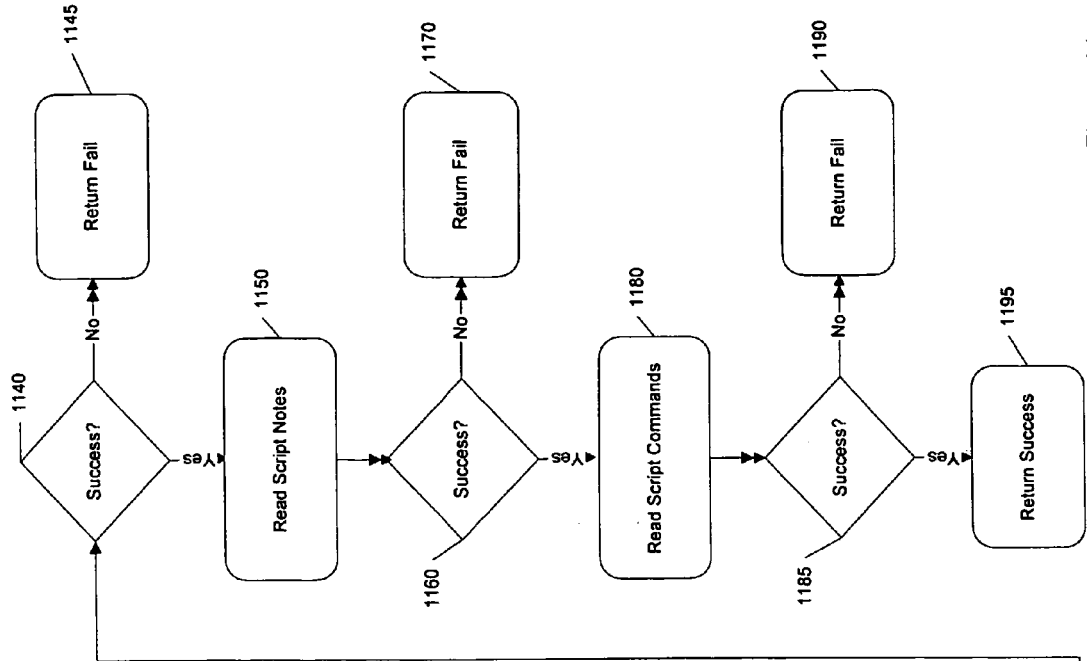
FIG. 11 illustrates the ParseScript process 1030 in an exemplary embodiment consistent with the present invention.
Figure 11:
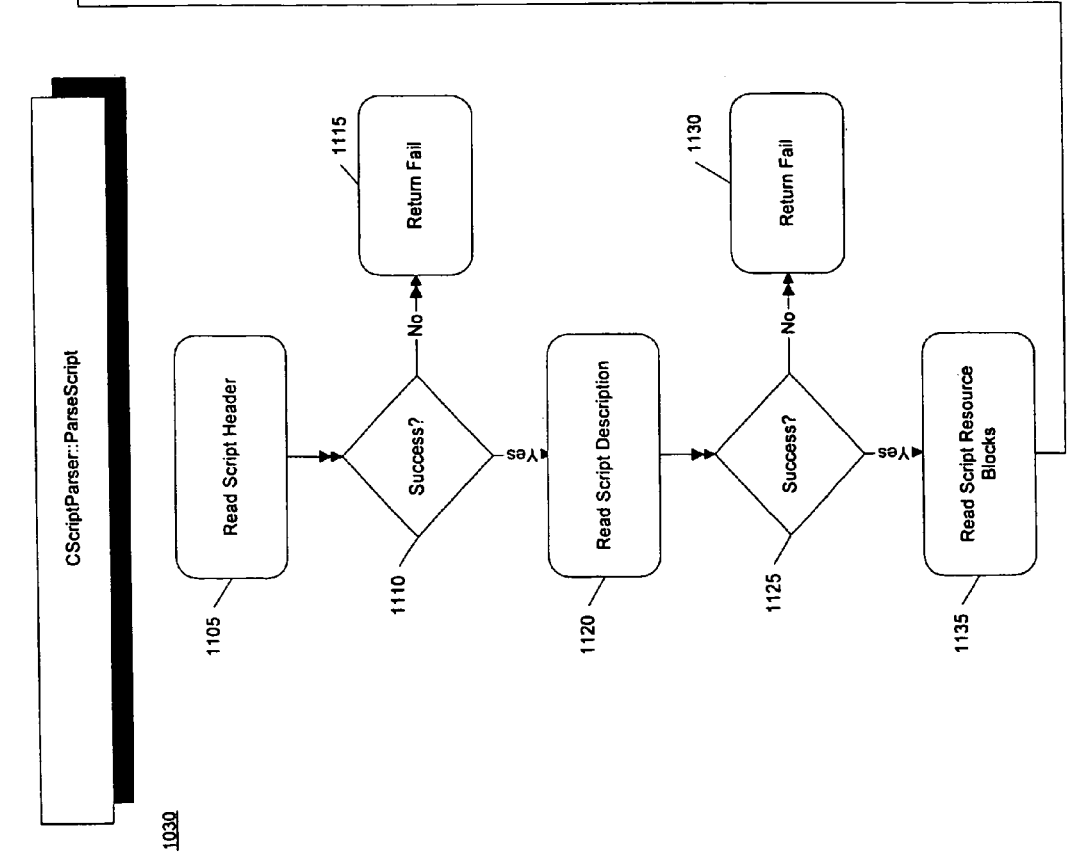

FIG. 11 illustrates the ParseScript process 1030 in an exemplary embodiment consistent with the present invention. At stage 1105 the script header is read. At stage 1110, if this reading is not successful, a failure is returned at stage 1115. If successful, the script description is read at stage 1120. If not successful a failure is returned at stage 1130. If successful, script resource blocks are read at stage 1135. If not successful a failure is returned at stage 1145. If successful, script notes are read at stage 1150. If script notes are successfully read, script commands are read at stage 1180; however, if script notes are not successfully read, a failure is returned at stage 1170.

Should the script commands be successfully read, a success is returned at stage 1195.

At this point, the script execute process 620 can begin (as shown on FIG. 6.

Figure 12:
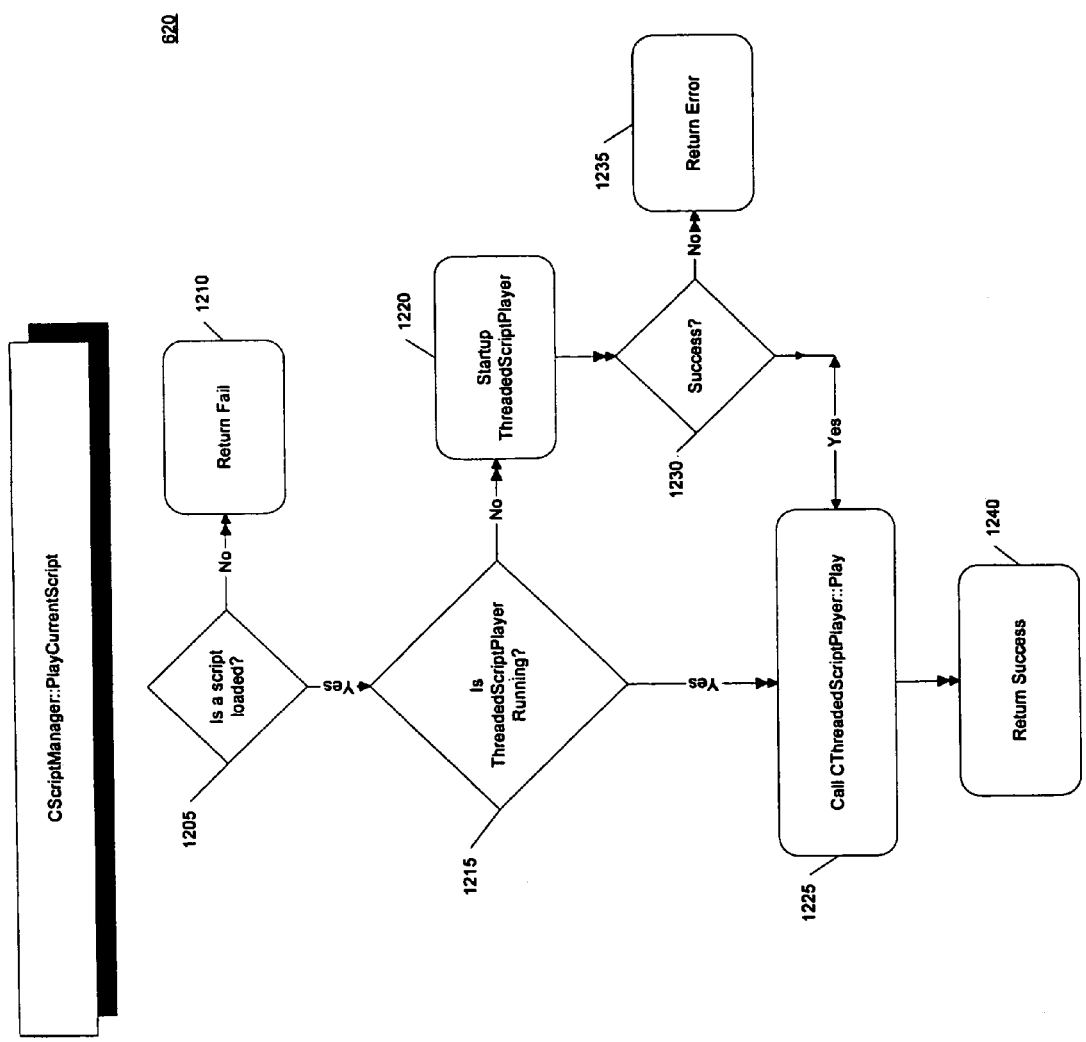
FIG. 12 illustrates the script execute process 620 in an exemplary embodiment consistent with the present invention.

FIG. 12 illustrates the script execute process 620 in an exemplary embodiment consistent with the present invention. At stage 1205, a verification is made that a script is loaded. Should this verification fail, a failure is returned at stage 1210. At stage 1215, a check is made as to whether the threaded script player is running. If not, at stage 1220, the threaded script player is started up. If successful, flow continues to stage 1225. If not, an error is returned at stage 1235.

At stage 1225, a call is made to execute the CThreadedScriptPlayer:Play process, and at stage 1240, a success is returned.

Figure 13:
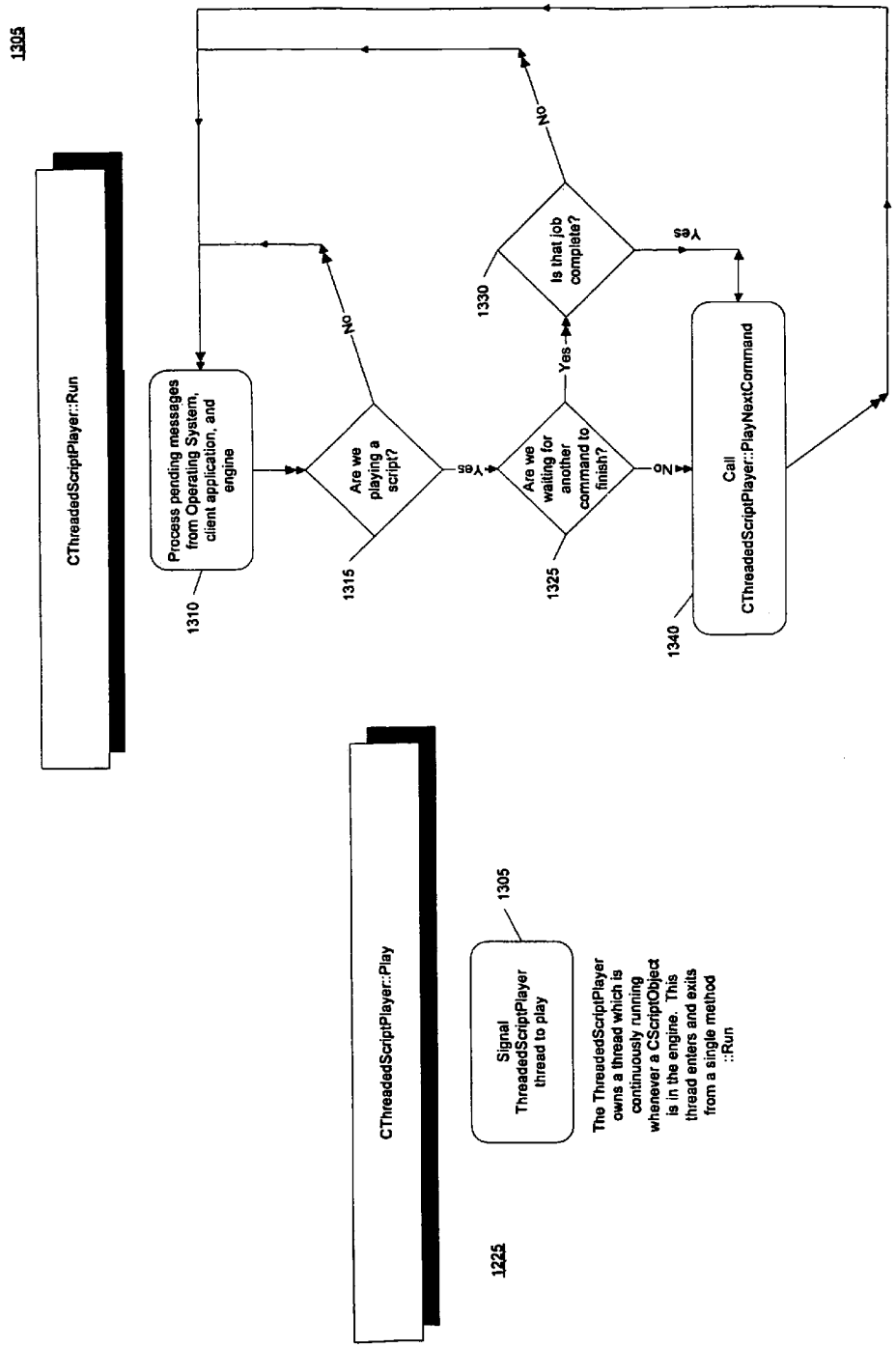
FIG. 13 illustrates the CThreadedScriptPlayer:Play process 1225 and the CThreadedScriptPlayer:Run process 1305 in an exemplary embodiment consistent with the present invention.

FIG. 13 illustrates the CThreadedScriptPlayer:Play process 1225 and the CThreadedScriptPlayer:Run process 1305 in an exemplary embodiment consistent with the present invention. The CThreadedScriptPlayer:Play process 1225 signals the ThreadedScriptPlayer to play the thread at stage 1305. The ThreadedSCriptPlayer owns a thread which may be continuously running whenever a CScriptObject is in the engine. This thread enters and exists from the method:Run illustrated in 1310 through 1340.

At stage 1310, pending messages from the operating system, the client application 110, and the engine are processed. For example, window event messages are processed if the user interacts with a window on the display. At stage 1315, a loop is entered (back to stage 1310) if a script is not being played. If a script is being played, at stage 1325 a check is made as to whether the script is waiting for another command to finish. If it is waiting, at stage 1330, a check is made to see if the job associated with the previous command is complete. If not, the wait loop is reentered by returning to stage 1310. If the job is complete, flow returns to stage 1340.

At stage 1340, the next command is played by CThreadedScriptPlayer:PlayNextCommand process.

Figure 14:
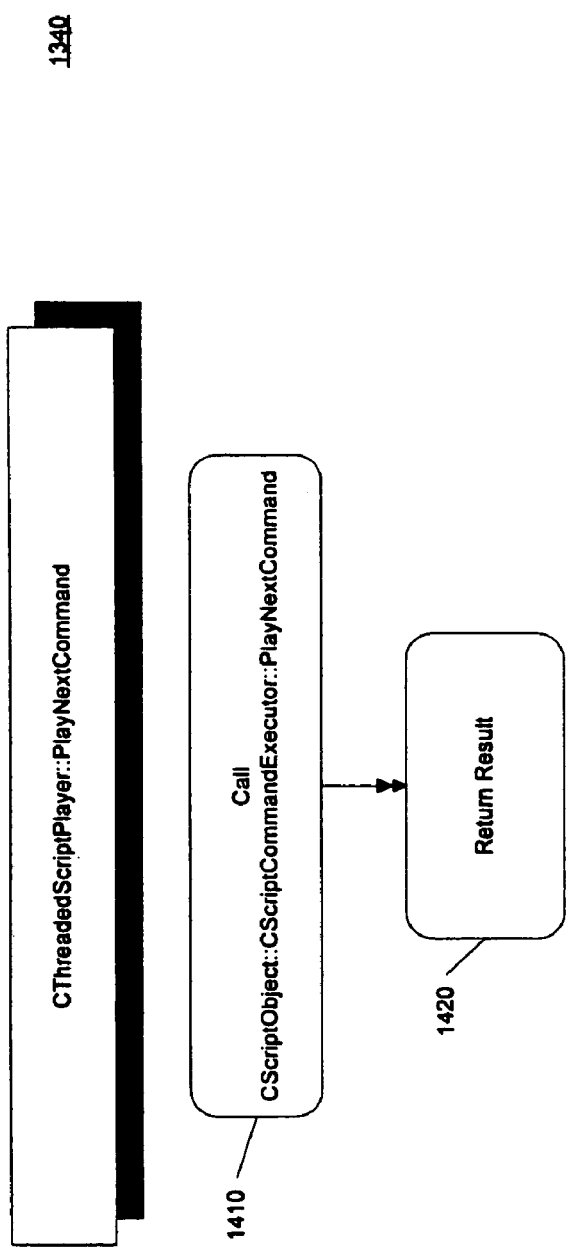
FIG. 14 illustrates a flowchart for the CThreadedScriptPlayer:PlayNextCommand process 1340 in an exemplary embodiment consistent with the present invention.

FIG. 14 illustrates a flowchart for the CThreadedScriptPlayer:PlayNextCommand process 1340 in an exemplary embodiment consistent with the present invention. At stage 1410, the PlayNextCommand process is executed and at stage 1420, the result returned.

Figure 15:
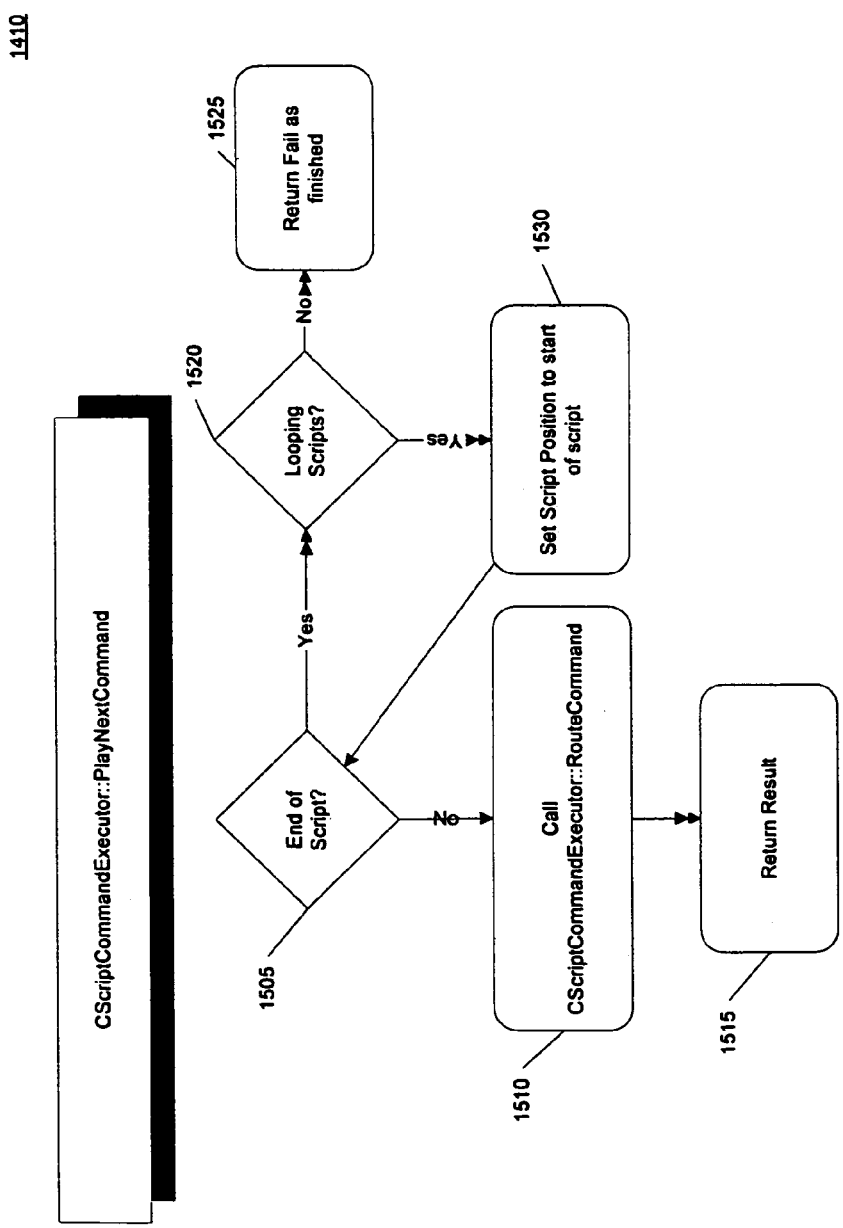
FIG. 15 illustrates the PlayNextCommand process 1410 in an exemplary embodiment consistent with the present invention.

FIG. 15 illustrates the PlayNextCommand process 1410 in an exemplary embodiment consistent with the present invention. At stage 1505, a check is made as to whether the end of the script has been reached. If so, at stage 1520, the process checks whether this is a looping script, and if not at stage 1525 a failed as finished result is returned. If it is a looping script, at stage 1530, the script is returned to the start of the script.

At stage 1510, a RouteCommand process is executed. At stage 1515, the result is returned.

Figure 16:
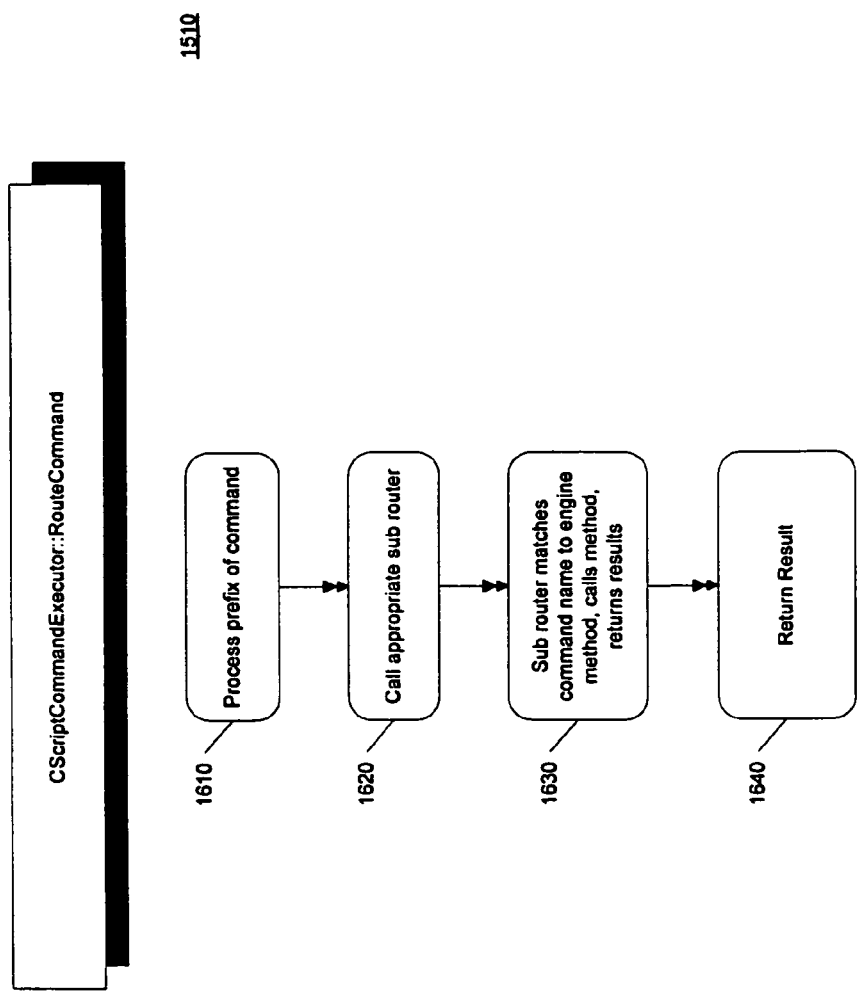
FIG. 16 illustrates the RouteCommand process 1510 in an exemplary embodiment consistent with the present invention.

FIG. 16 illustrates the RouteCommand process 1510 in an exemplary embodiment consistent with the present invention. At stage 1610, the prefix of the command is processed, so that at stage 1620 the appropriate subrouter can be called. At stage 1630, the subrouter matches the command name to the engine method, calls the method and returns the result. This is an instance where one of the other engine in the system may be invoked. For instance, an agent may be given a task to move across the screen or speak some lines. Or, a movie may be played. At stage 1640, the result is returned.

The AI Query Process

Figure 17:
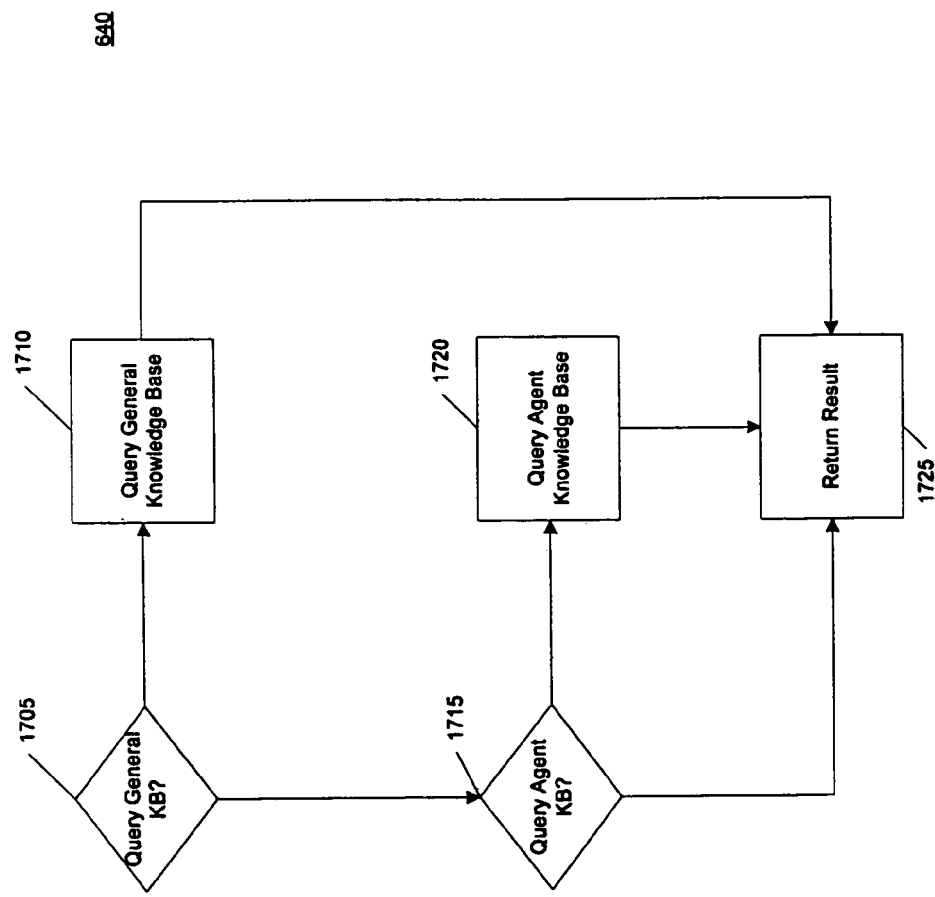
FIG. 17 illustrates the AI Query process 640 in an exemplary embodiment consistent with the present invention.

FIG. 17 illustrates the AI Query process 640 in an exemplary embodiment consistent with the present invention. AI Queries may generally be of two types: a general knowledge base query or an agent knowledge base query. The general knowledge base may be accessed through any agent. In other words, it serves as a base of knowledge which all agents possess. The agent knowledge base is knowledge only possessed by a given intelligent agent. When an agent is queried, it generally checks its agent knowledge base prior to checking the general knowledge base. Of course, those drafting the scripts may set up the query feature in any way they desire for the circumstances at hand.

The knowledge base may be constructed in the form of a series of questions and answers. The goal of the query process is to find a question closely matching the question posed, and then return the paired answer.

At stage 1705, the process checks whether a query has been made to the general knowledge base. If so, at stage 1710, the general knowledge base is queried. If not, a check is made at stage 1715 to see if the agent knowledge base is queried. If so, at stage 1720 the agent knowledge base is queried.

At stage 1725, results of the query are returned.

Figure 18:
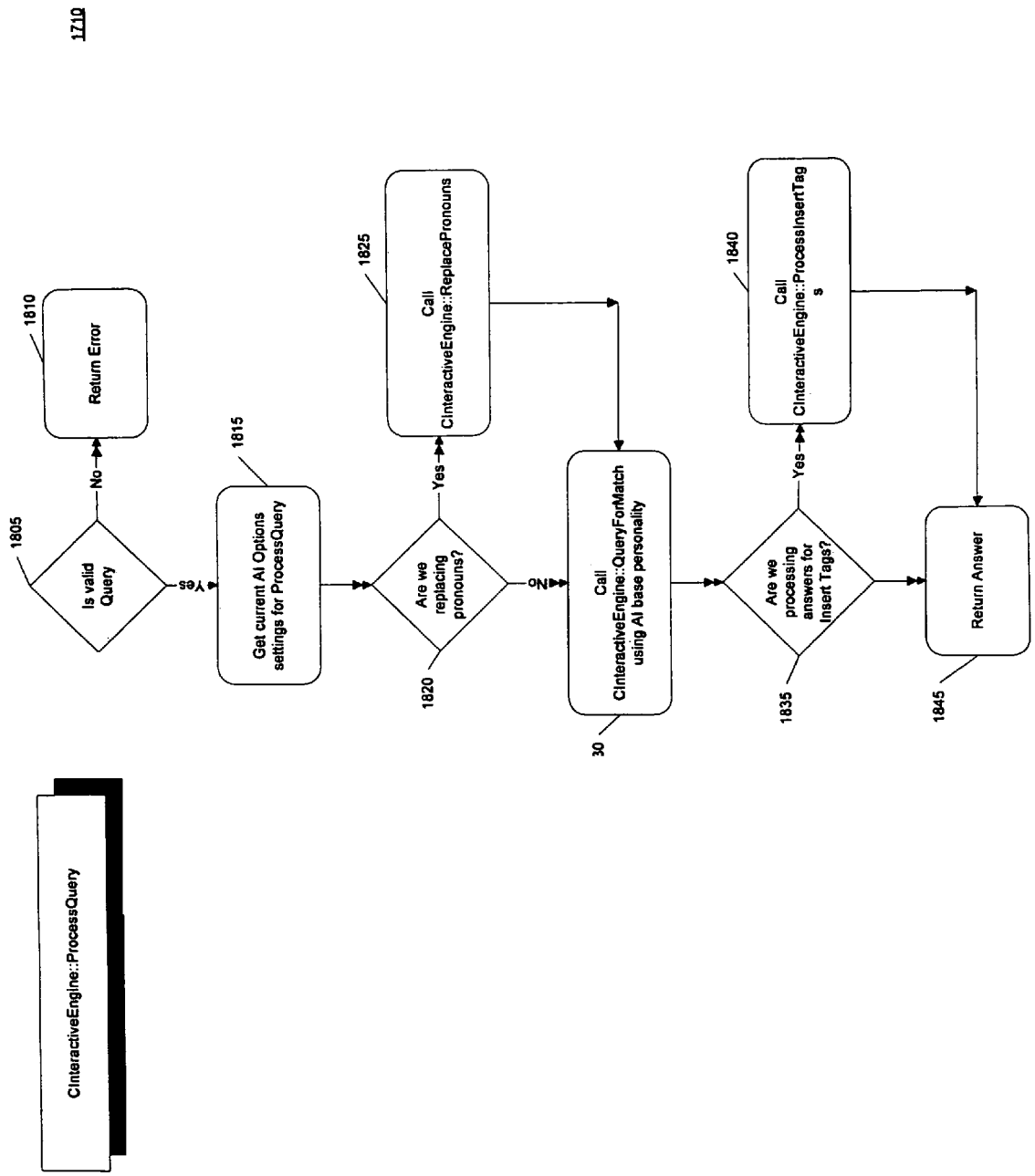
FIG. 18 illustrates the general knowledge base query 1710 in an exemplary embodiment consistent with the present invention.

FIG. 18 illustrates the general knowledge base query 1710 in an exemplary embodiment consistent with the present invention. At stage 1805, the general format of the query is examined to determine if it is valid. If it is not valid, at stage 1810 an error is returned. If the query is valid, at stage 1815, the current Al options are retrieved from the common engine 140 for the knowledge base query 1710. At stage 1820, if pronouns are to be replaced, the replace pronouns process is called at stage 1825. Pronouns can be replaced to enhance the accuracy and results of a query. At stage 1830, the CInteractiveEngine:QueryForMatch is called. At stage 1835, if insert tags are being processed, the ProcessInsertTags process is called at stage 1840. At stage 1845, the answer is returned.

Figure 19:
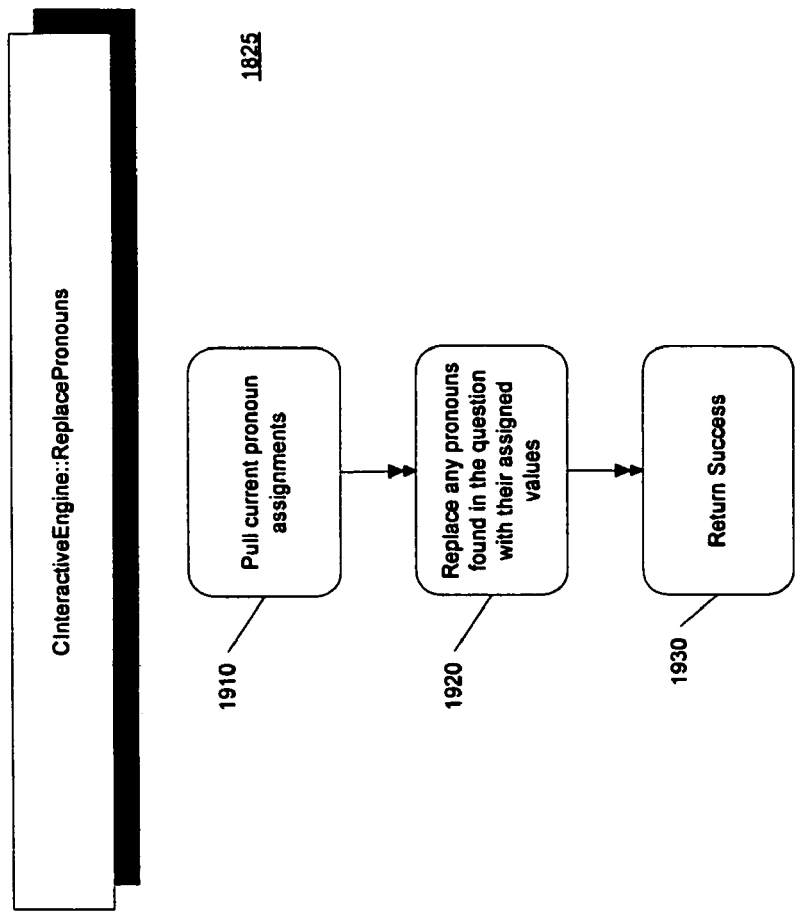
FIG. 19 illustrates the replace pronouns process 1825 in an exemplary embodiment consistent with the present invention.

FIG. 19 illustrates the replace pronouns process 1825 in an exemplary embodiment consistent with the present invention. At stage 1910, current pronoun assignments are pulled from the common engine 140. For example, if a previous question related to Abraham Lincoln, and the current query used "he," or "him," or "her," then that would be replaced with Abraham Lincoln. At stage 1920, the pronouns are replaced with their assigned value as just described. At stage 1930, a success is returned.

Figure 20:
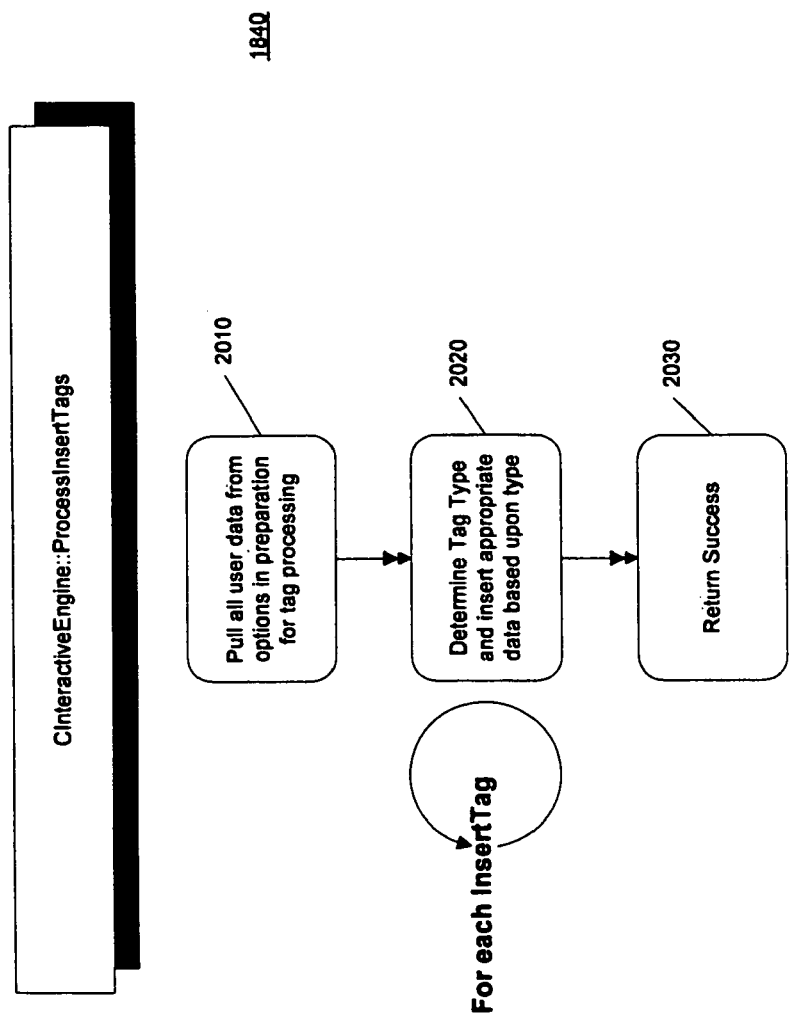
FIG. 20 illustrates the process insert tags process 1840 in an exemplary embodiment consistent with the present invention.

FIG. 20 illustrates the process insert tags process 1840 in an exemplary embodiment consistent with the present invention. At stage 2010, user data is pulled from the common engine 140 in preparation for tag processing. At stage 2020, for every tag, the appropriate data is inserted, or replaced. This is generally used to personalize the output of query results, e.g., by inserting the name of the user in the answer. At stage 2030, a success is returned.

Figure 21:
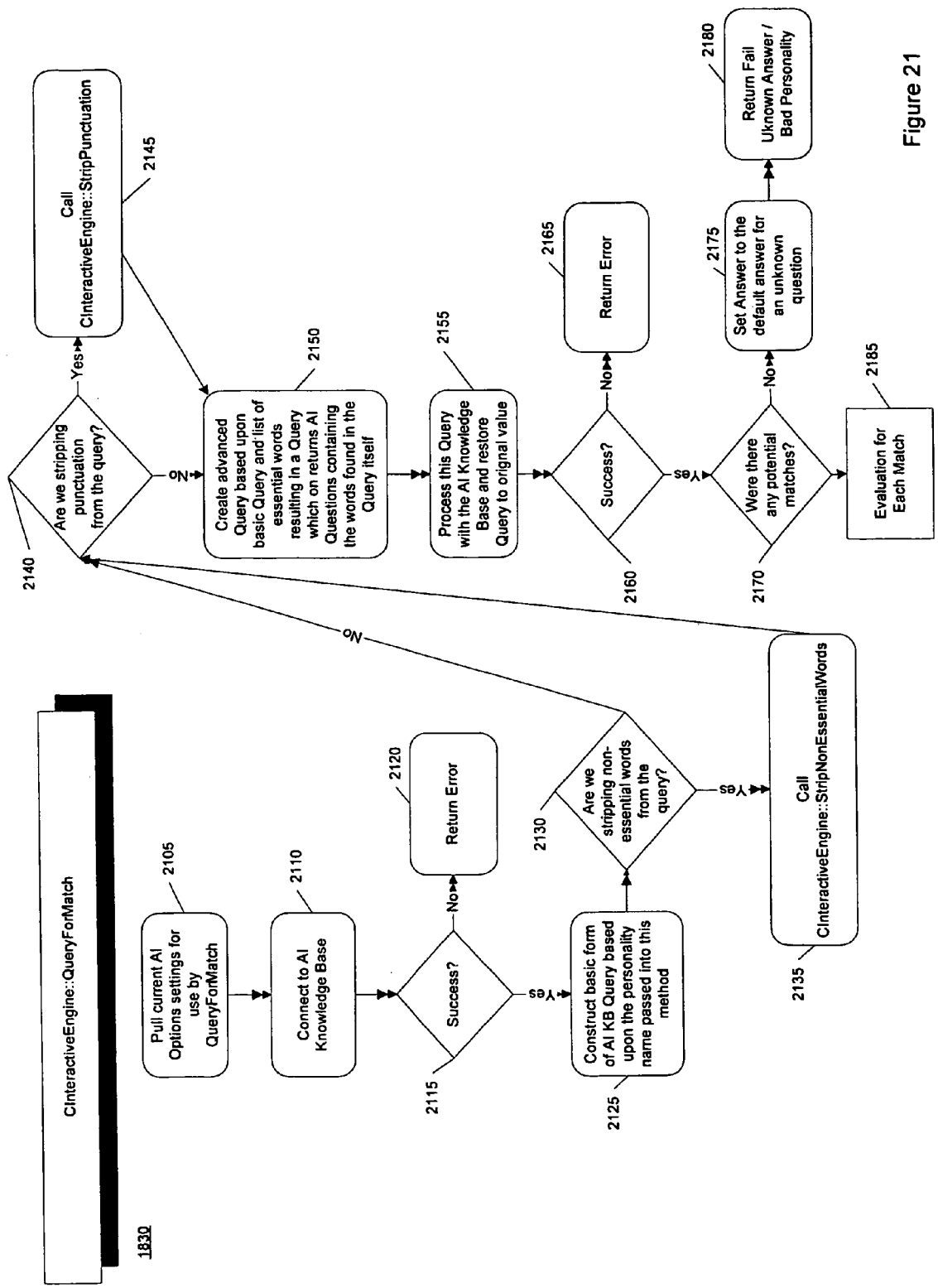
FIG. 21 illustrates the QueryForMatch process 1830 in an exemplary embodiment consistent with the present invention.

FIG. 21 illustrates the QueryForMatch process 1830 in an exemplary embodiment consistent with the present invention. At stage 2105, the current AI options for query are pulled from the common engine 140. At stage 2110, a connection is made to the AI Knowledge Base. As will be described later, the knowledge base may reside on a server that is separate from the location of the engines. At stage 2115, a check is made as to the success of the connection to the database. If the connection has failed, an error is returned at stage 2120.

At stage 2125, the basic form of the AI Knowledge Base query is constructed based on a personality name passed into this process or method. At stage 2135, a check is made as to whether non-essential words are to be stripped. A non-essential word may be, for example, "the," or "a". If non-essential words are to be stripped, at stage 2135 the StripNonEssentialWord process is invoked.

At stage 2140, a check is made as to whether punctuation is to be stripped. If so, at stage 2145, the StripPunctuation process 2145 is invoked. At stage 2150, an advanced query is created based on the basic query established in process 2125 and on a list of essential words. This advanced query will return Al Questions containing the words found in the query itself. At stage 2155, this advanced query is processed and the query is restored to its original value.

If this is not successful, at stage 2165 an error is returned. If there were potential matches (determined at stage 2170), at stage 2185, the matches are evaluated. If there were not potential matches, at stage 2175 the answer is set to a default answer, such as "I don't know," and a failure is returned for an unknown answer for bad personality at stage 2180.

Figure 22:
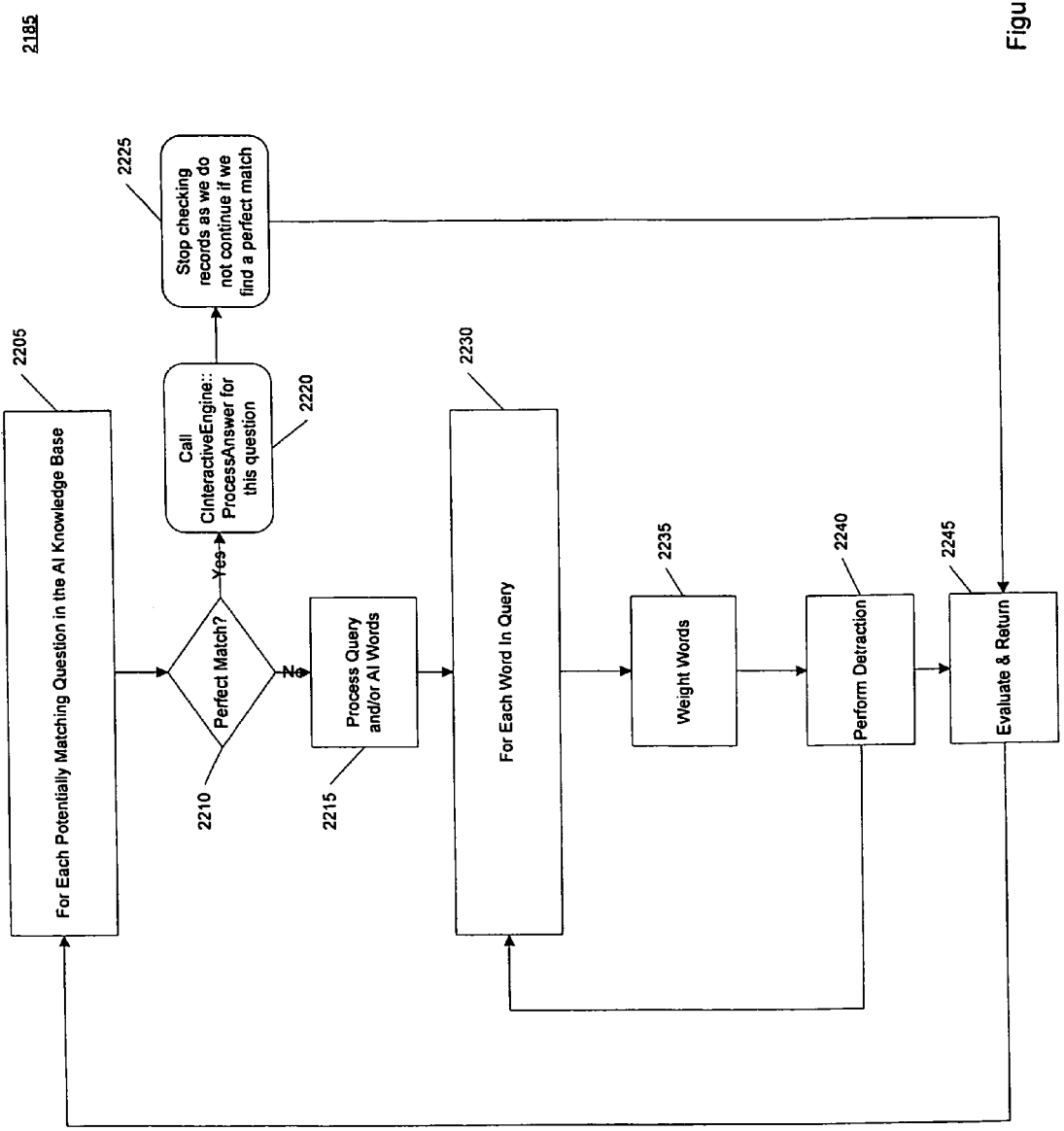
FIG. 22 illustrates the evaluate match process 2185 in an exemplary embodiment consistent with the present invention.

FIG. 22 illustrates the evaluate match process 2185 in an exemplary embodiment consistent with the present invention. As 2205 illustrates, the process 2185 is operated for each potentially matching question in the Al Knowledge Base. Other embodiments may elect to operate on less than each potentially matching question. At stage 2210, if a perfect match is found there may be no need to continue, so processing goes to stage 2220 where the answer is processed. At stage 2225, further records are not checked and processing goes to stage 2245 for evaluation and return.

If a perfect match is not found, at stage 2215, the query process 2215 occurs. At stages 2230–2240, for each word in the query, the words are weighted in weighting process 2235 and detraction may be performed at stage 2240. At stage 2245, the weighted answer is evaluated and returned.

Figure 23:
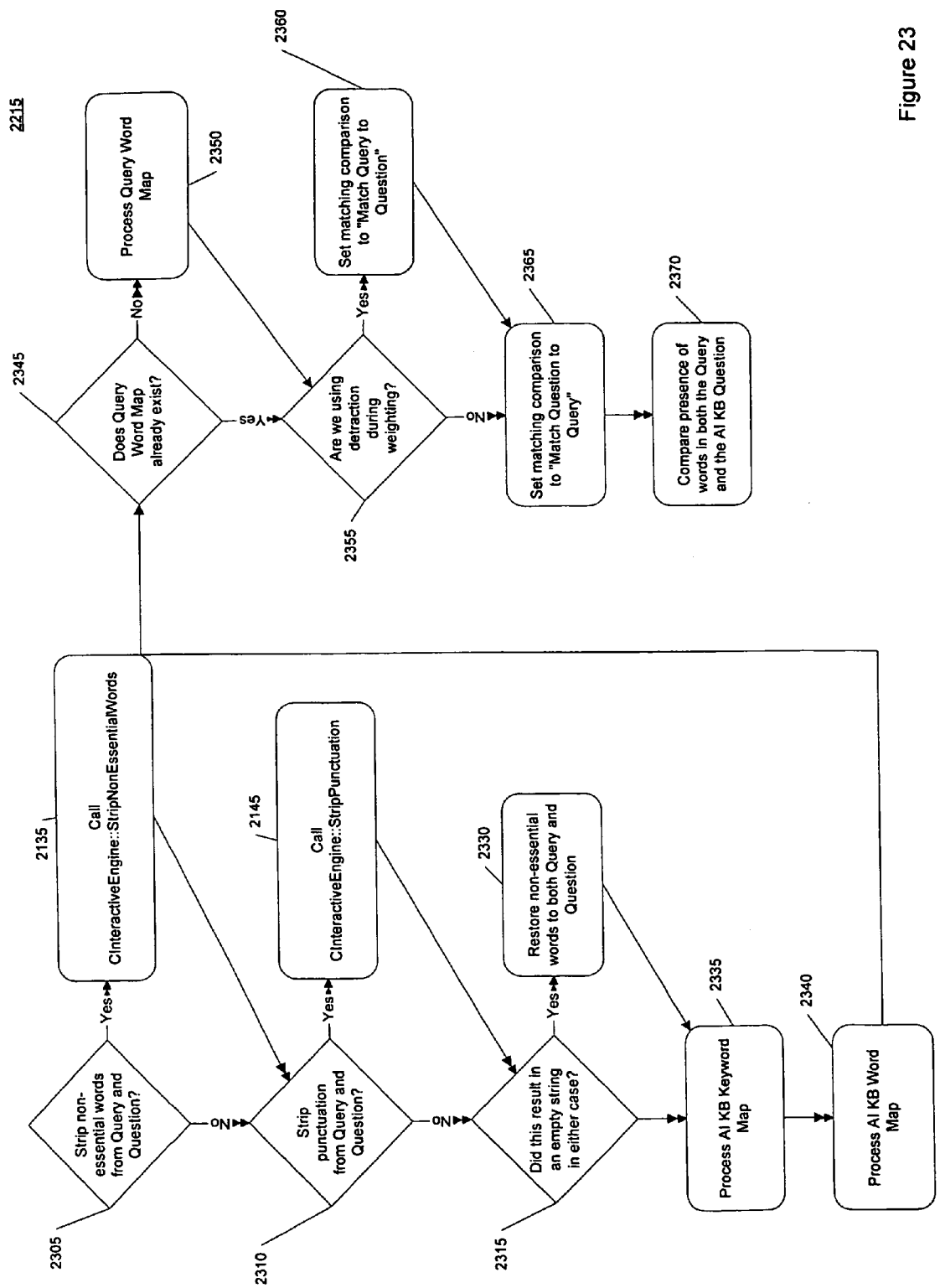
FIG. 23 illustrates query process 2215 in an exemplary embodiment consistent with the present invention.

FIG. 23 illustrates query process 2215 in an exemplary embodiment consistent with the present invention. Many variables may be set and stored in the common engine relating to query processing. At stage 2305, if stripping non-essential words is enabled, then StripNonEssentialWords process 2135 is called. At stage 2310, if stripping punctuation is enabled, then StripPunctuation process 2145 is called.

At stage 2315, a check is made to see if the stripping, or original input, resulted in an empty query string. If so, the non-essential words may be restored at stage 2330.

At stage 2335, the AI Knowledge Base Keyword Map is processed which maps the query onto the questions in the knowledge base.

At stage 2340, the AI Knowledge Base Word map is processed which maps the query onto the questions in the knowledge base.

At stage 2345, if the query word map does not exist it is processed at stage 2350. If it does exist, at stage 2355 a check is made as to whether detraction is going to be used during weighting. Detraction is where a query mapping or weighting is downgraded based on words that appear in the query that do not appear in the knowledge base. If detraction will be used, at stage 2360, the matching comparison is set to match query to question. If not used, at stage 2365, the query is set to match the question to the query. At stage 2370, the presence of words in both the query and the AI Knowledge Base Question is compared.

Figure 24:
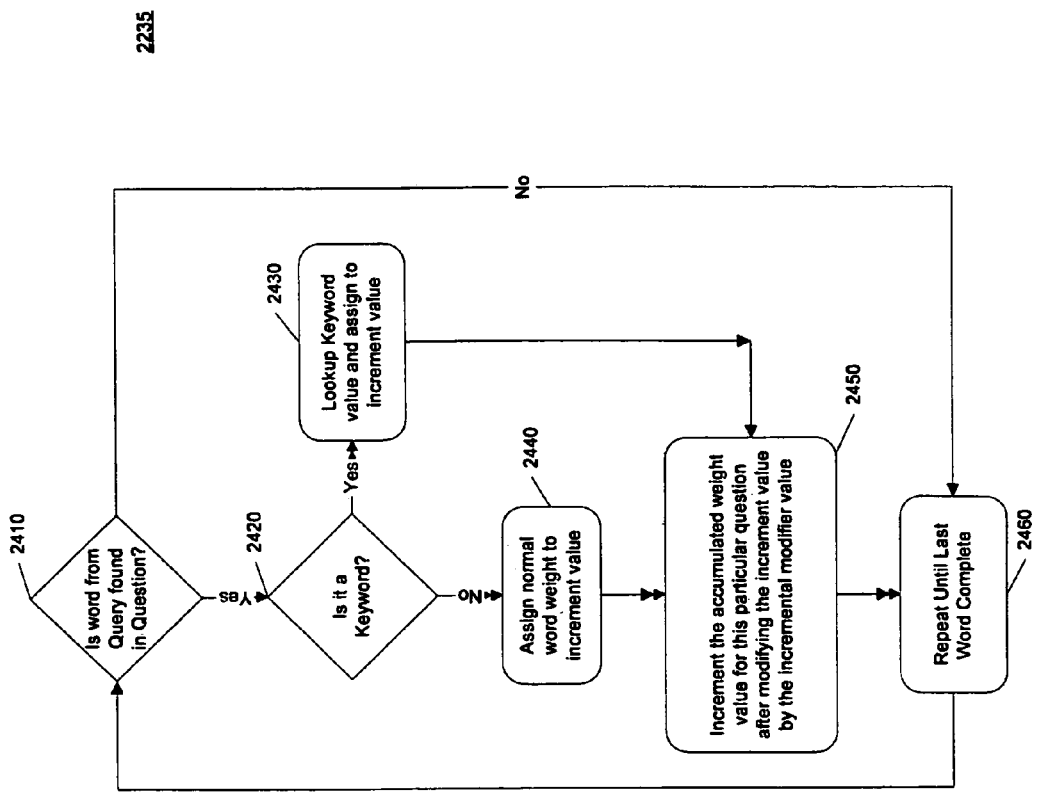
FIG. 24 illustrates a flow chart of the word weighting process 2235 in an exemplary embodiment consistent with the present invention.

FIG. 24 illustrates a flow chart of the word weighting process 2235 in an exemplary embodiment consistent with the present invention. At stage 2410, the process checks whether a word from the query is found in the question. If not, the process continues to stage 2460 to get the next word in the query. If so, at stage 2420, a check is made to see if it is a keyword match. A keyword match may be more heavily weighted than a non-keyword match. At stage 2430, the keyword value is used to increment the score of the match. At stage 2440, if the match is not a keyword, then a normal weight is applied to the score. At stage 2450, the accumulated weight for the question is incremented by the proper score for the match. At stage 2460, the process continues as long as there are more words in the query.

Figure 25:
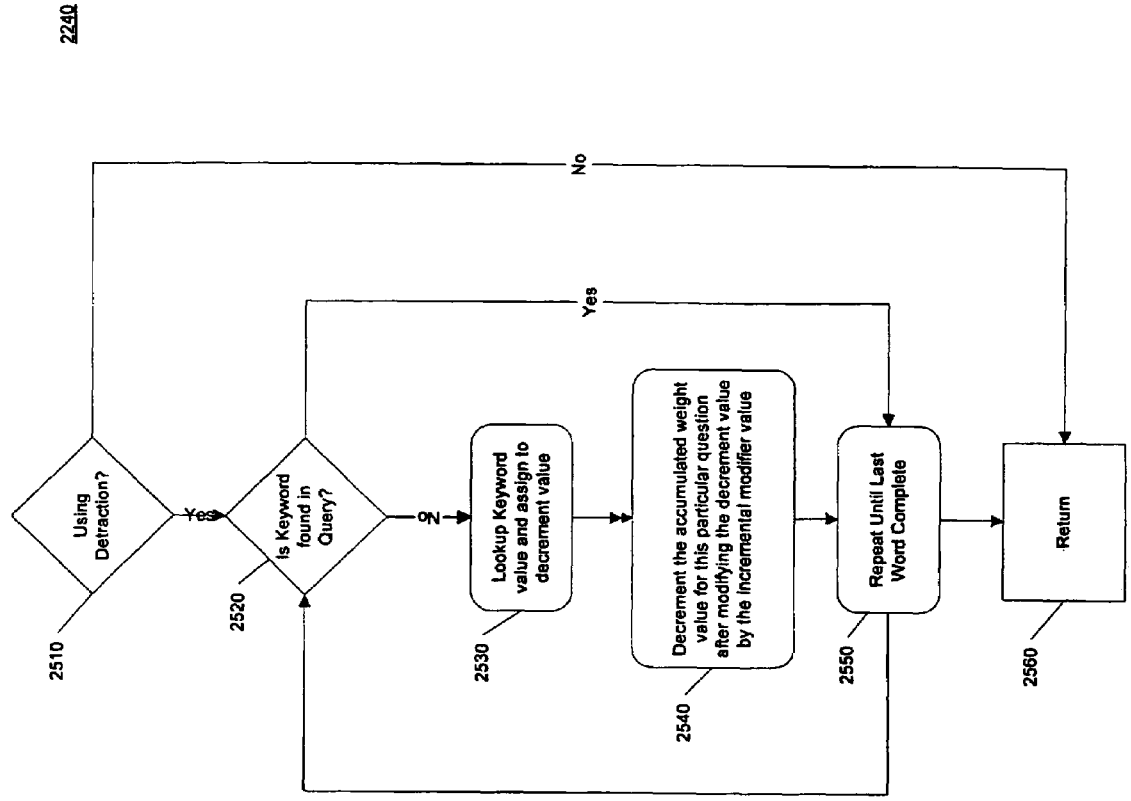
FIG. 25 illustrates a flow chart of the detraction process 2240 in an exemplary embodiment consistent with the present invention.

FIG. 25 illustrates a flow chart of the detraction process 2240 in an exemplary embodiment consistent with the present invention. At stage 2510, an initial check is made as to whether detraction is used. If not, this process returns as stage 2560. If so, at stage 2520 a check is made to see if a keyword is found in the query. If so, flow continues to stage 2550. If not, at stage 2530, the keyword value is looked up and at stage 2540 used to decrement the weight of the query. At stage 2550, the process continues for each word until complete.

Figure 26:
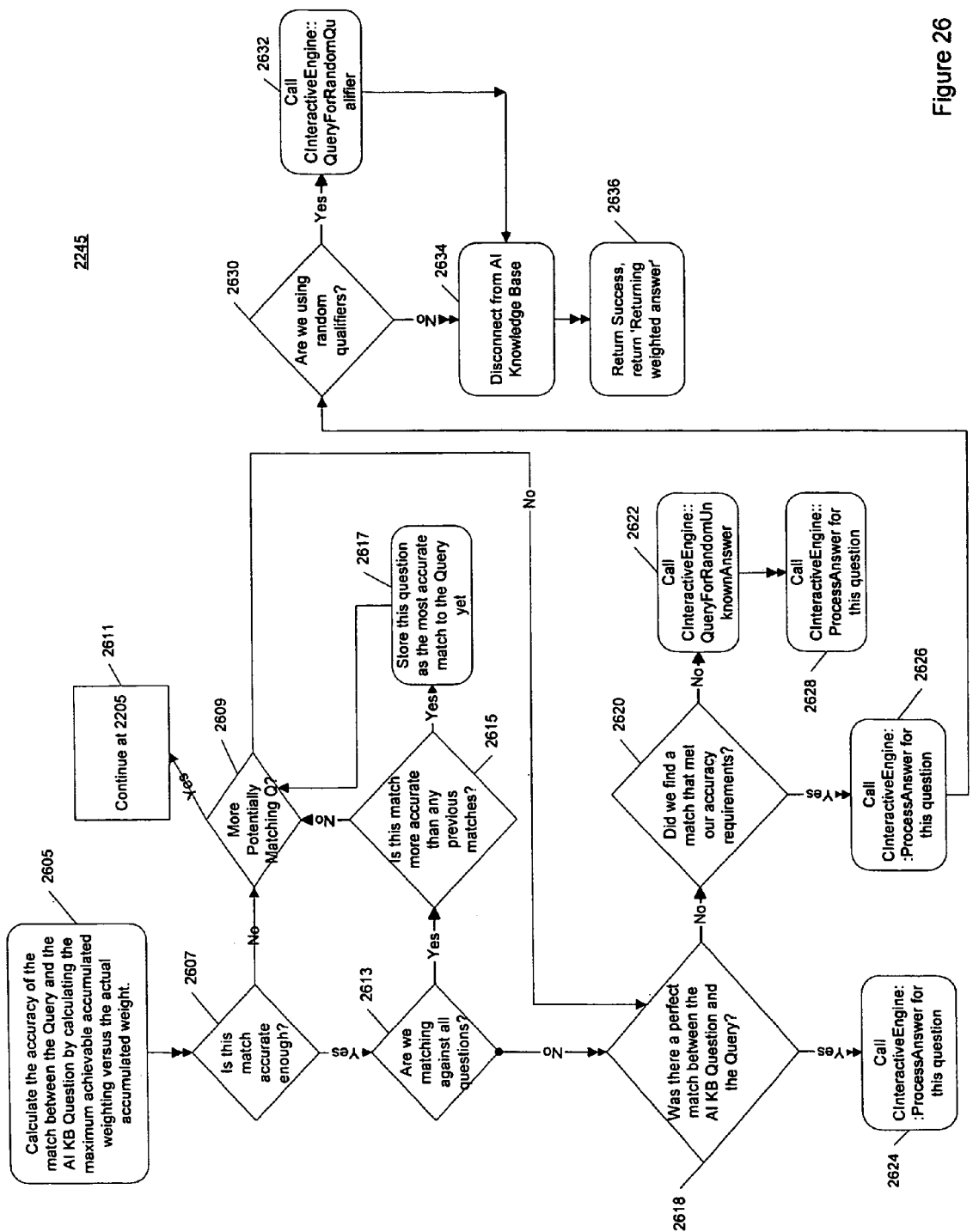
FIG. 26 illustrates the evaluation process 2245 in an exemplary embodiment consistent with the present invention.

FIG. 26 illustrates the evaluation process 2245 in an exemplary embodiment consistent with the present invention. At stage 2605, the process calculates the accuracy of the match between the query and the AI Knowledge Base by calculating the maximum achievable accumulated weight versus the actual accumulated weight and putting this in terms of a percentage. Therefore, 100% is perfect and 95% is close. At stage 2607, a check is made as to whether the match for this query is close enough. Close enough may be determined by a parameter stored in the common engine 140, such as 94% may be close enough.

If the match is not close enough, at stage 2609 the system checks if there are more potentially matching questions and if so continues at process 2611. If there are no more potential questions, flow continues to stage 2618.

If the match is close enough, a check is made as to whether the system parameters indicate that matching should occur across all questions at stage 2613. If so, at stages 2615 and 2617, the system checks to see if this is the closest match and stores the update if it is the closest match.

If the system is not matching against all questions, at stage 2618, a check is made to see if there is a perfect match. If so, at stage 2624 a success perfect match is returned and a ProcessAnswer invoked. If not, at stage 2620, a check is made to see if a match is found that meets the accuracy requirements. If not, at stage 2622 QueryForRandomUnknownAnswer is called and a ProcessAnswer invoked at stage 2628 with the random answer.

If the process met the accuracy requirements, at stage 2626 ProcessAnswer process is called. At stage 2630, if random qualifier are activated flow continues to stage 2632 where a call is made to QueryForRandomQualifier process 2632. At stage 2634, the process 2245 disconnects from the Knowledge Base and a success is returned at stage 2636 with the message that a weighted answer is being returned.

Figure 27:
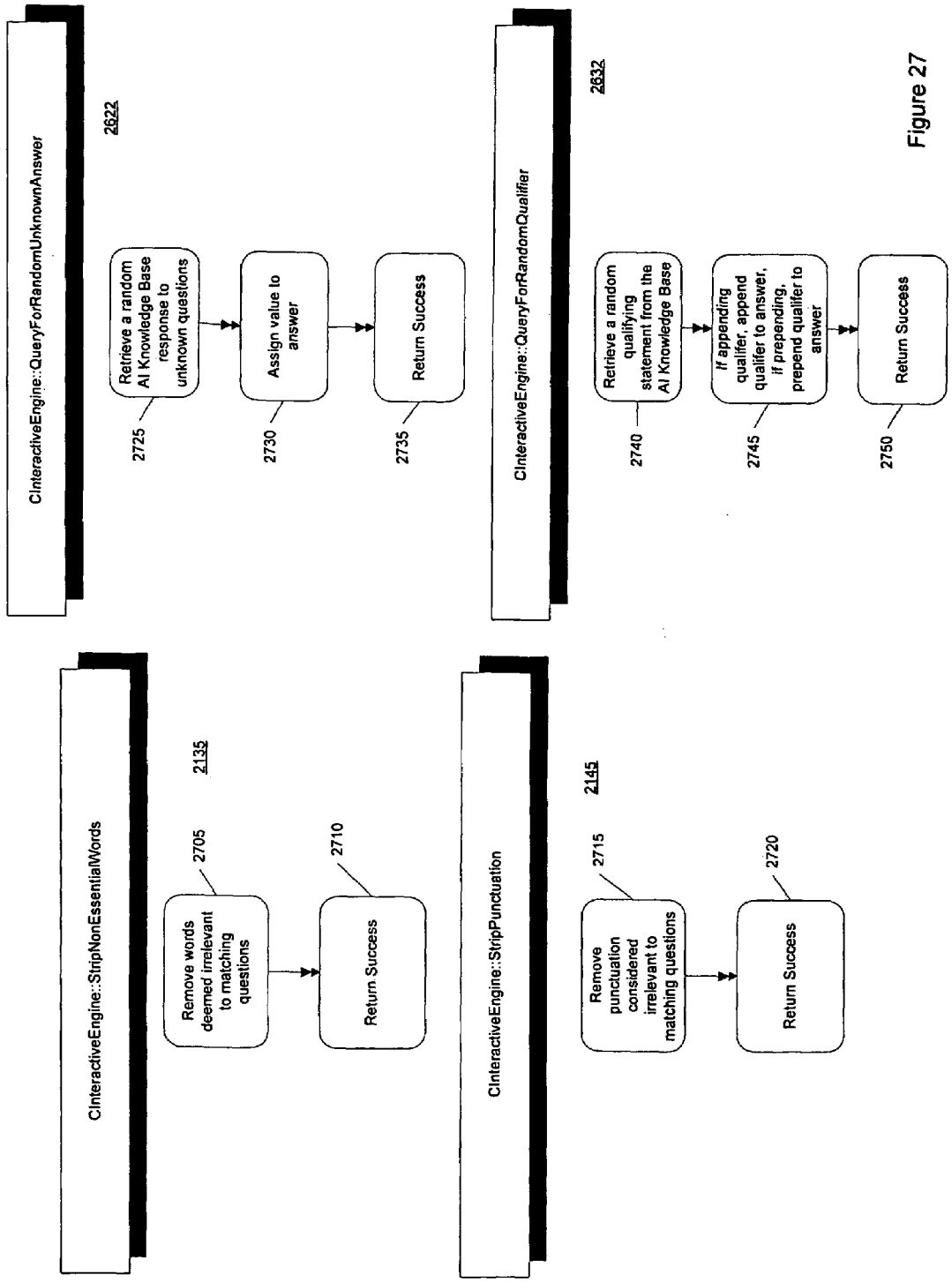
FIG. 27 illustrates processes to strip non-essential words, strip punctuation, query for a random unknown answer, and query for a random qualifier in an exemplary embodiment consistent with the present invention.

FIG. 27 illustrates processes to strip non-essential words, strip punctuation, query for a random unknown answer, and query for a random qualifier in an exemplary embodiment consistent with the present invention. StripNonEssentialWords process 2135 begins at stage 2705 where words deemed irrelevant by the system are stripped from the query, and at stage 2710 a success is returned. StripPunctuation process 2145 begins at stage 2715 and removes irrelevant punctuation from the query, returning at stage 2720.

QueryForRandomUnknownAnswer process 2622 retrieves a random response at stage 2725, assigns a value to the response at stage 2730 and returns at stage 2735. QueryForRandomQualifier process 2632 retrieves a random qualifying statement, e.g., "To the best of my knowledge," at stage 2740, appends or prepends to the answer at stage 2745, and returns at stage 2750.

Figure 28:
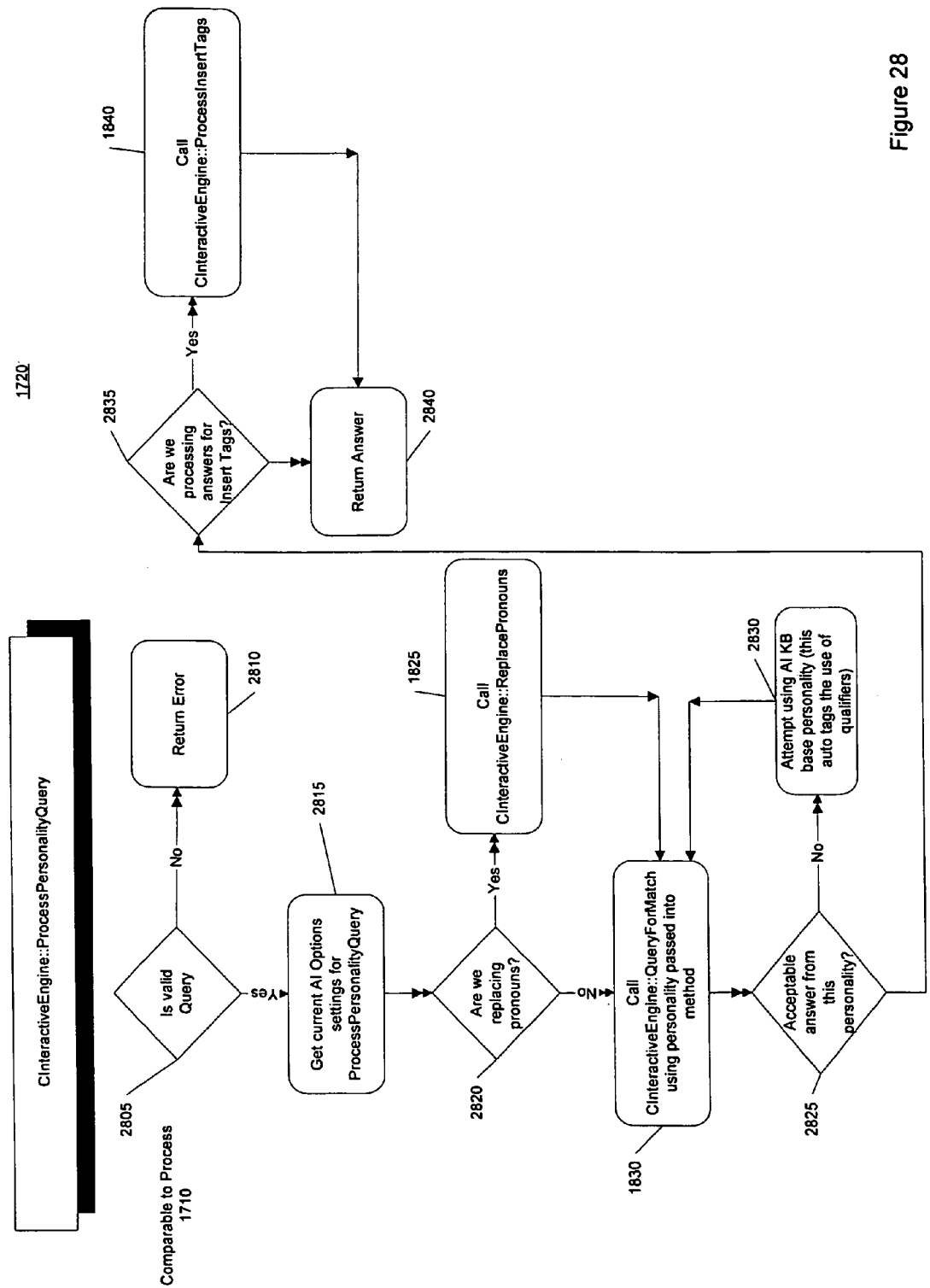
FIG. 28 illustrates query agent process 1720 in an exemplary embodiment consistent with the present invention.

FIG. 28 illustrates query agent process 1720 in an exemplary embodiment consistent with the present invention. This process is comparable to the query knowledge base process 1710 except that the agent knowledge base is queried in addition to and prior to the AI knowledge base. At stage 2805, the validity of the query is checked. At stage 2815, the current AI options for the personality, or intelligent agent, are retrieved. At stage 2820, if pronouns are to be replaced, replace pronouns process 1825 is called. At stage 1830, query for match process 1830 is called passing the personality, or intelligent agent, whose knowledge base should be searched. At stage 2825, if the search of the agent's knowledge base fails to return an acceptable answer, then at stage 2830, the general knowledge base is passed to stage 1830. At stages 2835 and 1840, insert tags are processed if necessary and at stage 2840, the answer is returned.

Hardware of Exemplary Embodiments

Figure 29:
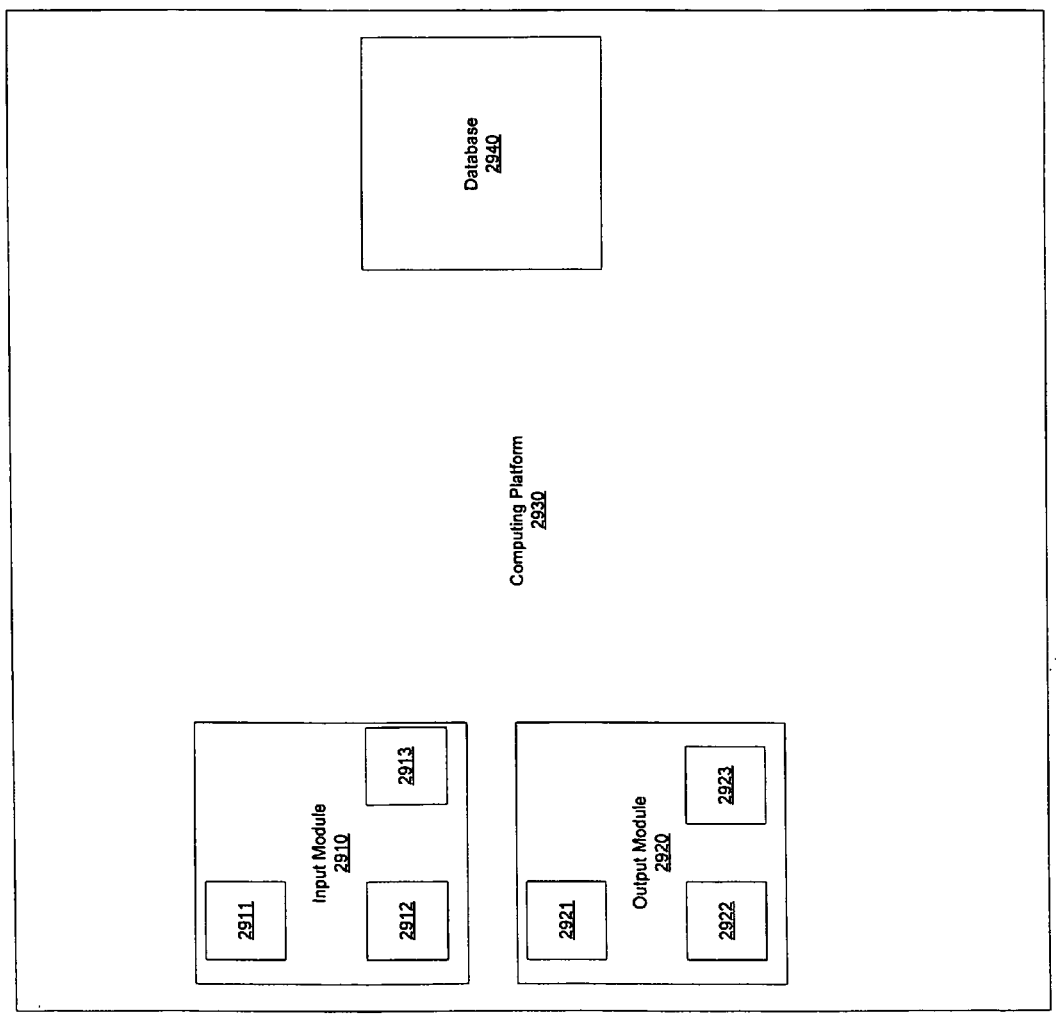
FIG. 29 illustrates a hardware environment on which the system 100 of the present invention may operate.

A hardware platform capable of implementing the system is now illustrated. By way of a non-limiting example, FIG. 29 illustrates a system environment in which the features and principles of the present invention may be implemented. As illustrated in the block diagram of FIG. 29, a system environment consistent with an embodiment of the present invention includes an input module 2910, an output module 2920, a computing platform 2930, and a database 2940. Computing platform 2930 is adapted to include the necessary functionality and computing capabilities to respond to queries input through input module 2910 and access, read and write to database 2940. The results of analyzing the data are provided as output from computing platform 2930 to output module 2920 for printed display, viewing, or further communication to other system devices. Such output may include, for example, one or more intelligent agents. Output from computing platform 2930 can also be provided to database 2940, which may be utilized as a persistent storage device.

In the embodiment of FIG. 29, computing platform 2930 may comprise a PC or mainframe computer for performing various functions and operations of the invention. Computing platform 2930 may be implemented, for example, by a general purpose computer selectively activated or reconfigured by a computer program stored in the computer, or may be a specially constructed computing platform for carrying-out the features and operations of the present invention. Computing platform 2930 may also be implemented or provided with a wide variety of components or subsystems including, for example, one or more of the following: one or more central processing units, a co-processor, memory, registers, and other data processing devices and subsystems. Computing platform 2930 also communicates or transfers queries and responses to and from input module 2910 and output module 2920 through the use of direct connections or communication links, as illustrated in FIG. 29. In the exemplary embodiment of the invention, a firewall prevents access to the platform by unpermitted outside sources.

Alternatively, communication between computing platform 2930 and modules 2910, 2920 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or a shared network architecture, computing platform 2930 may be located in the same location or at a geographically distant location from input module 2910 and/or output module 2920.

Input module 2910 of the system environment shown in FIG. 29 may be implemented with a wide variety of devices to receive and/or provide the data as input to computing platform 2930. As illustrated in FIG. 29, input module 2910 includes an input device 2911, a storage device 2912, and/or a network 2913. Input device 2911 may include a keyboard, a mouse, a disk drive, video camera, magnetic card reader, or any other suitable input device for providing customer data to computing platform 2930. Memory device may be implemented with various forms of memory or storage devices, such as read-only memory (ROM) devices and random access memory (RAM) devices. Storage device 2912 may include a memory tape or disk drive for reading and providing customer or credit data on a storage tape or disk as input to computing platform 2920. Input module 2910 may also include network interface 2913, as illustrated in FIG. 29, to receive data over a network (such as a LAN, WAN, intranet or the Internet) and to provide the same as input to computing platform 2930. For example, network interface 2913 may be connected to a public or private database over a network for the purpose of receiving information.

As illustrated in FIG. 29, output module 2920 includes a display 2921, a printer device 2922, and/or a network interface 2923 for receiving the results provided as output from computing module 2920. As indicated above, the output from computing platform 2930 may include displays of intelligent agents or query responses. The output from computing platform 2930 may be displayed or viewed through display 2921 (such as a CRT or LCD) and printer device 2922. If needed, network interface 2923 may also be provided to facilitate the communication of the results from computer platform 2930 over a network (such as a LAN, WAN, intranet or the Internet) to remote or distant locations for further analysis or viewing.

FIG. 30 illustrates an exemplary embodiment of a client/server hardware setup on which the present invention may operate. While embodiments of the present invention may operate in a complete stand alone fashion with all engines and databases residing on a single platform, it is contemplated that a client/server relationship may provide additional benefits in certain settings. FIG. 30 illustrates one of many potential client/server environments.

Client hardware systems 3005 and 3010 operate client applications 3015 and 3020 respectively. The client applications 3005 and 3010, or front ends, communicate to the Logical Engines 3025 and 3030 respectively. The Logical Engines 3025 and 3030 may comprise client side components illustrated in 3035 and 3040 respectively. These may include the Common Engine, Display Engine, Interactive Engine, and Script Engine. A server 3050 may also, or in replacement, contain the Common Engine component and the Interactive Engine component. By maintaining the Common Engine component and the Interactive Engine component on a server, multiple clients may share the knowledge bases and user information and parameter settings.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing interactive responses to a user through an intelligent agent provided by a computer system, comprising:

executing a script for providing the intelligent agent to a user at a display, wherein the intelligent agent is an animated character that produces speech in response to user queries and wherein executing the script comprises loading the script into the memory of a computer, parsing the script, and executing the script within a thread on the computer;

receiving, from a user input, a query directed to the intelligent agent by the user;

querying a knowledge database that is specifically associated with the intelligent agent to determine an appropriate response to the query;

should the querying of the knowledge database that is specifically associated with the intelligent agent fail to provide an appropriate response to the query, querying a general knowledge database that is accessible by a plurality of intelligent agents to determine an appropriate response to the query;

providing the appropriate response to the query to the user, via the intelligent agent; and displaying a multimedia object on a display for the user.

2. A method of providing interactive responses to a user through an intelligent agent provided by a computer system, comprising:

executing a script for providing the intelligent agent to a user at a display, wherein the intelligent agent is an animated character that produces speech in response to user queries;

receiving, from a user input, a query directed to the intelligent agent by the user;

querying a knowledge database that is specifically associated with the intelligent agent to determine an appropriate response to the query;

should the querying of the knowledge database that is specifically associated with the intelligent agent fail to provide an appropriate response to the query, querying a general knowledge database that is accessible by a plurality of intelligent agents to determine an appropriate response to the query; and providing the appropriate response to the query to the user, via the intelligent agent, wherein providing the appropriate response further comprises animating the intelligent agent to convey the appropriate response to the user.

3. A method of providing interactive responses to a user through an intelligent agent provided by a computer system, comprising:

executing a script for providing the intelligent agent to a user at a display, wherein the intelligent agent is an animated character that produces speech in response to user queries;

receiving, from a user input, a query directed to the intelligent agent by the user;

querying a knowledge database that is specifically associated with the intelligent agent to determine an appropriate response to the query;

should the querying of the knowledge database that is specifically associated with the intelligent agent fail to provide an appropriate response to the query, querying a general knowledge database that is accessible by a plurality of intelligent agents to determine an appropriate response to the query;
providing the appropriate response to the query to the user, via the intelligent agent; and
storing information about the user in a database.

4. The method of claim 3, further comprising retrieving the stored information about the user from the database if the user has information previously stored.

5. A machine readable medium for storing instructions for operating a computer system for providing interactive responses to a user through an intelligent agent provided by the computer system, the instructions comprising:
   executing a script for providing the intelligent agent to a user on a display, wherein the intelligent agent is an animated character that produces speech in response to user queries and wherein executing the script comprises loading the script into the memory of a computer, parsing the script, and executing the script within a thread on the computer;
   receiving from a user input, a query directed to the intelligent agent by the user;
   querying a knowledge database that is specifically associated with the intelligent agent to determine an appropriate response to the query;
   should the knowledge database that is specifically associated with the intelligent agent fail to provide an appropriate response to the query, querying a general knowledge database that is accessible by a plurality of intelligent agents to determine an appropriate response to the query;
   providing the appropriate response to the query to the user via the intelligent agent; and
   displaying a multimedia object on a display for the user.

6. A machine readable medium for storing instructions for operating a computer system for providing interactive responses to a user through an intelligent agent provided by the computer system, the instructions comprising:
   executing a script for providing the intelligent agent to a user on a display, wherein the intelligent agent is an animated character that produces speech in response to user queries;
   receiving from a user input, a query directed to the intelligent agent by the user;
   querying a knowledge database that is specifically associated with the intelligent agent to determine an appropriate response to the query;
   should the knowledge database that is specifically associated with the intelligent agent fail to provide an appropriate response to the query, querying a general knowledge database that is accessible by a plurality of intelligent agents to determine an appropriate response to the query;
   providing the appropriate response to the query to the user via the intelligent agent; and
   animating the intelligent agent to convey the appropriate response to the user.

7. A machine readable medium for storing instructions for operating a computer system for providing interactive responses to a user through an intelligent agent provided by the computer system, the instructions comprising:
   executing a script for providing the intelligent agent to a user on a display, wherein the intelligent agent is an animated character that produces speech in response to user queries;
   receiving from a user input, a query directed to the intelligent agent by the user;
   querying a knowledge database that is specifically associated with the intelligent agent to determine an appropriate response to the query;
   should the knowledge database that is specifically associated with the intelligent agent fail to provide an appropriate response to the query, querying a general knowledge database that is accessible by a plurality of intelligent agents to determine an appropriate response to the query;
   providing the appropriate response to the query to the user via the intelligent agent; and
   storing information about the user in a database.

8. The machine readable medium of claim 7, further comprising instructions for retrieving the stored information about the user from the database if the user has information previously stored.

9. A computer system for providing an intelligent agent to interact with a user, comprising:
   a general knowledge database and a knowledge database that is specifically associated with the intelligent agent;
   memory;
   a display for displaying the intelligent agent;
   an input device for receiving input from the user; and
   a processor coupled to the databases, the memory, the display and the input device, wherein said processor is operable to:
   execute a script for providing the intelligent agent to the user on the display, wherein the intelligent agent is an animated character that produces speech in response to user queries wherein executing the script comprises loading the script into the memory of a computer, parsing the script, and executing the script within a thread on the computer;
   receive a query directed to the intelligent agent by the user from the input device;
   query the knowledge database that is specifically associated with the intelligent agent to determine an appropriate response to the query;
   should the querying of the knowledge database that is specifically associated with the intelligent agent fail to provide an appropriate response to the query, query the general knowledge database to determine an appropriate response to the query;
   provide the appropriate response to the query to the user via the intelligent agent on the display; and
   displaying a multimedia object on a display for the user.

10. A computer system for providing an intelligent agent to interact with a user, comprising:
   a general knowledge database and a knowledge database that is specifically
   associated with the intelligent agent;
   memory;
   a display for displaying the intelligent agent;
   an input device for receiving input from the user; and
   a processor coupled to the databases, the memory, the display and the input device, wherein said processor is operable to:
   execute a script for providing the intelligent agent to the user on the display, wherein the intelligent agent is an animated character that produces speech in response to user queries;
   receive a query directed to the intelligent agent by the user from the input device;
   query the knowledge database that is specifically associated with the intelligent agent to determine an appropriate response to the query;

should the querying of the knowledge database that is specifically associated with the intelligent agent fail to provide an appropriate response to the query, query the general knowledge database to determine an appropriate response to the query;

provide the appropriate response to the query to the user via the intelligent agent on the display; and animating the intelligent agent to convey the appropriate response to the user.

11. A computer system for providing an intelligent agent to interact with a user, comprising:

a general knowledge database and a knowledge database that is specifically associated with the intelligent agent;

memory;

a display for displaying the intelligent agent;

an input device for receiving input from the user; and a processor coupled to the databases, the memory, the display and the input device, wherein said processor is operable to:

execute a script for providing the intelligent agent to the user on the display, wherein the intelligent agent is an animated character that produces speech in response to user queries;

receive a query directed to the intelligent agent by the user from the input device;

query the knowledge database that is specifically associated with the intelligent agent to determine an appropriate response to the query;

should the querying of the knowledge database that is specifically associated with the intelligent agent fail to provide an appropriate response to the query, query the general knowledge database to determine an appropriate response to the query;

provide the appropriate response to the query to the user via the intelligent agent on the display; and storing information about the user in a database.

\* \* \* \* \*